US012777138B2

(12) United States Patent
Xiong et al.

(10) Patent No.: US 12,777,138 B2

(45) Date of Patent: Oct. 27, 2026

(54) MASK GENERATION WITH OBJECT AND SCENE SEGMENTATION FOR PASSTHROUGH EXTENDED REALITY (XR)

(71) Applicant: Samsung Electronics Co., Ltd., Suwon-si (KR)

(72) Inventors: Yingen Xiong, Mountain View, CA (US); Christopher A. Peri, Mountain View, CA (US)

(73) Assignee: Samsung Electronics Co., Ltd., Suwon-si (KR)

(*) Notice: Subject to any disclaimer, the term of this patent is extended or adjusted under 35 U.S.C. 154(b) by 488 days.

(21) Appl. No.: 18/360,677

(22) Filed: Jul. 27, 2023

(65) Prior Publication Data

US 2024/0223739 A1 Jul. 4, 2024

Related U.S. Application Data

(60) Provisional application No. 63/436,236, filed on Dec. 30, 2022.

(51) Int. Cl.
*H04N 13/128* (2018.01)
*G06T 19/00* (2011.01)
*H04N 13/00* (2018.01)

(52) U.S. Cl.
CPC ......... *H04N 13/128* (2018.05); *G06T 19/006* (2013.01); *H04N 2013/0092* (2013.01)

(58) Field of Classification Search
CPC .......... H04N 13/128; H04N 2013/0092; G06T 19/006; G06T 2207/20081; G06T 2207/20084; G06T 7/11; G06T 7/194
(Continued)

(56) References Cited

U.S. PATENT DOCUMENTS 10,593,066 B1 3/2020 Dhua et al.
10,708,577 B2 7/2020 Trail
(Continued)

FOREIGN PATENT DOCUMENTS

CN 108230338 A 6/2018
CN 110490877 A 11/2019
(Continued)

OTHER PUBLICATIONS

International Search Report and Written Opinion of the International Searching Authority dated Jan. 26, 2024 in connection with International Patent Application No. PCT/KR2023/017160, 8 pages.
(Continued)

*Primary Examiner* — Allen H Nguyen

(57) ABSTRACT

A method includes obtaining first and second image frames of a scene. The method also includes providing the first image frame as input to an object segmentation model, where the object segmentation model is trained to generate first object segmentation predictions for objects in the scene and a depth or disparity map based on the first image frame. The method further includes generating second object segmentation predictions for the objects in the scene based on the second image frame. The method also includes determining boundaries of the objects in the scene based on the first and second object segmentation predictions. In addition, the method includes generating a virtual view for presentation on a display of an extended reality (XR) device based on the boundaries of the objects in the scene.

20 Claims, 13 Drawing Sheets

(58) Field of Classification Search
USPC .......................................................... 382/154
See application file for complete search history.

(56) References Cited

U.S. PATENT DOCUMENTS

| | | | | |
|---|---|---|---|---|
| 10,860,919 | B2 | 12/2020 | Kanazawa et al. | |
| 2017/0148223 | A1 | 5/2017 | Holzer et al. | |
| 2017/0243352 | A1 | 8/2017 | Kutliroff et al. | |
| 2017/0365100 | A1 | 12/2017 | Walton | |
| 2018/0101994 | A1 | 4/2018 | da Veiga et al. | |
| 2018/0350150 | A1 | 12/2018 | Powderly et al. | |
| 2020/0326847 | A1 | 10/2020 | Wang et al. | |
| 2021/0142497 | A1* | 5/2021 | Pugh | G06T 7/543 |
| 2022/0058871 | A1* | 2/2022 | Cheng | G06T 7/55 |
| 2022/0148284 | A1 | 5/2022 | Kim et al. | |
| 2022/0180521 | A1 | 6/2022 | Wu et al. | |
| 2022/0230397 | A1 | 7/2022 | Xiong et al. | |
| 2023/0298181 | A1* | 9/2023 | Utasi | G06T 7/12<br>382/100 |
| 2024/0112426 | A1* | 4/2024 | Berliner | G06F 3/012 |

FOREIGN PATENT DOCUMENTS

| | | | |
|---|---|---|---|
| CN | 111695573 | A | 9/2020 |
| CN | 108370438 | B | 3/2021 |
| CN | 113676721 | A | 11/2021 |
| KR | 10-1451236 | B1 | 10/2014 |
| KR | 10-2022-0064857 | A | 5/2022 |

OTHER PUBLICATIONS

Tang et al., "Look Closer to Segment Better: Boundary Patch Refinement for Instance Segmentation," Computer Vision and Pattern Recognition, 2021, 10 pages.
Supplementary European Search Report dated Sep. 25, 2025 in connection with European Patent Application No. 23912524.8, 12 pages.
Lu et al., "Multi-Task Learning for Single Image Depth Estimation and Segmentation Based on Unsupervised Network," IEEE International Conference on Robotics and Automation (ICRA), 2020, 7 pages.
Office Action issued Mar. 31, 2026 in connection with European Patent Application No. 23912524.8, 7 pages.

* cited by examiner

900

1000

1100

MASK GENERATION WITH OBJECT AND SCENE SEGMENTATION FOR PASSTHROUGH EXTENDED REALITY (XR)

CROSS-REFERENCE TO RELATED APPLICATION AND PRIORITY CLAIM

This application claims priority under 35 U.S.C. § 119(e) to U.S. Provisional Patent Application No. 63/436,236 filed on Dec. 30, 2022, which is hereby incorporated by reference in its entirety.

TECHNICAL FIELD

This disclosure relates generally to extended reality (XR) systems and processes. More specifically, this disclosure relates to mask generation with object and scene segmentation for passthrough XR.

BACKGROUND

Extended reality (XR) systems are becoming more and more popular over time, and numerous applications have been and are being developed for XR systems. Some XR systems (such as augmented reality or "AR" systems and mixed reality or "MR" systems) can enhance a user's view of his or her current environment by overlaying digital content (such as information or virtual objects) over the user's view of the current environment. For example, some XR systems can often seamlessly blend virtual objects generated by computer graphics with real-world scenes.

SUMMARY

This disclosure relates to mask generation with object and scene segmentation for passthrough extended reality (XR).

In a first embodiment, a method includes obtaining first and second image frames of a scene. The method also includes providing the first image frame as input to an object segmentation model, where the object segmentation model is trained to generate first object segmentation predictions for objects in the scene and a depth or disparity map based on the first image frame. The method further includes generating second object segmentation predictions for the objects in the scene based on the second image frame. The method also includes determining boundaries of the objects in the scene based on the first and second object segmentation predictions. In addition, the method includes generating a virtual view for presentation on a display of an XR device based on the boundaries of the objects in the scene. In a related embodiment, a non-transitory machine-readable medium stores instructions that when executed cause at least one processor to perform the method of the first embodiment.

In a second embodiment, an XR device includes multiple imaging sensors configured to capture first and second image frames of a scene. The XR device also includes at least one processing device configured to provide the first image frame as input to an object segmentation model, where the object segmentation model is trained to generate first object segmentation predictions for objects in the scene and a depth or disparity map based on the first image frame. The at least one processing device is also configured to generate second object segmentation predictions for the objects in the scene based on the second image frame. The at least one processing device is further configured to determine boundaries of the objects in the scene based on the first and second object segmentation predictions. In addition, the at least one processing device is configured to generate a virtual view based on the boundaries of the objects in the scene. The XR device further includes at least one display configured to present the virtual view.

In a third embodiment, a method includes obtaining first and second training image frames of a scene and extracting features of the first training image frame. The method also includes providing the extracted features of the first training image frame as input to an object segmentation model being trained, where the object segmentation model is configured to generate object segmentation predictions for objects in the scene and a depth or disparity map. The method further includes reconstructing the first training image frame based on the depth or disparity map and the second training image frame. In addition, the method includes updating the object segmentation model based on the first training image frame and the reconstructed first training image frame. In a related embodiment, an electronic device includes at least one processing device configured to perform the method of the third embodiment. In another related embodiment, a non-transitory machine-readable medium stores instructions that when executed cause at least one processor to perform the method of the third embodiment.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IOT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include any other electronic devices now known or later developed.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which.

DETAILED DESCRIPTION

Figure 1:
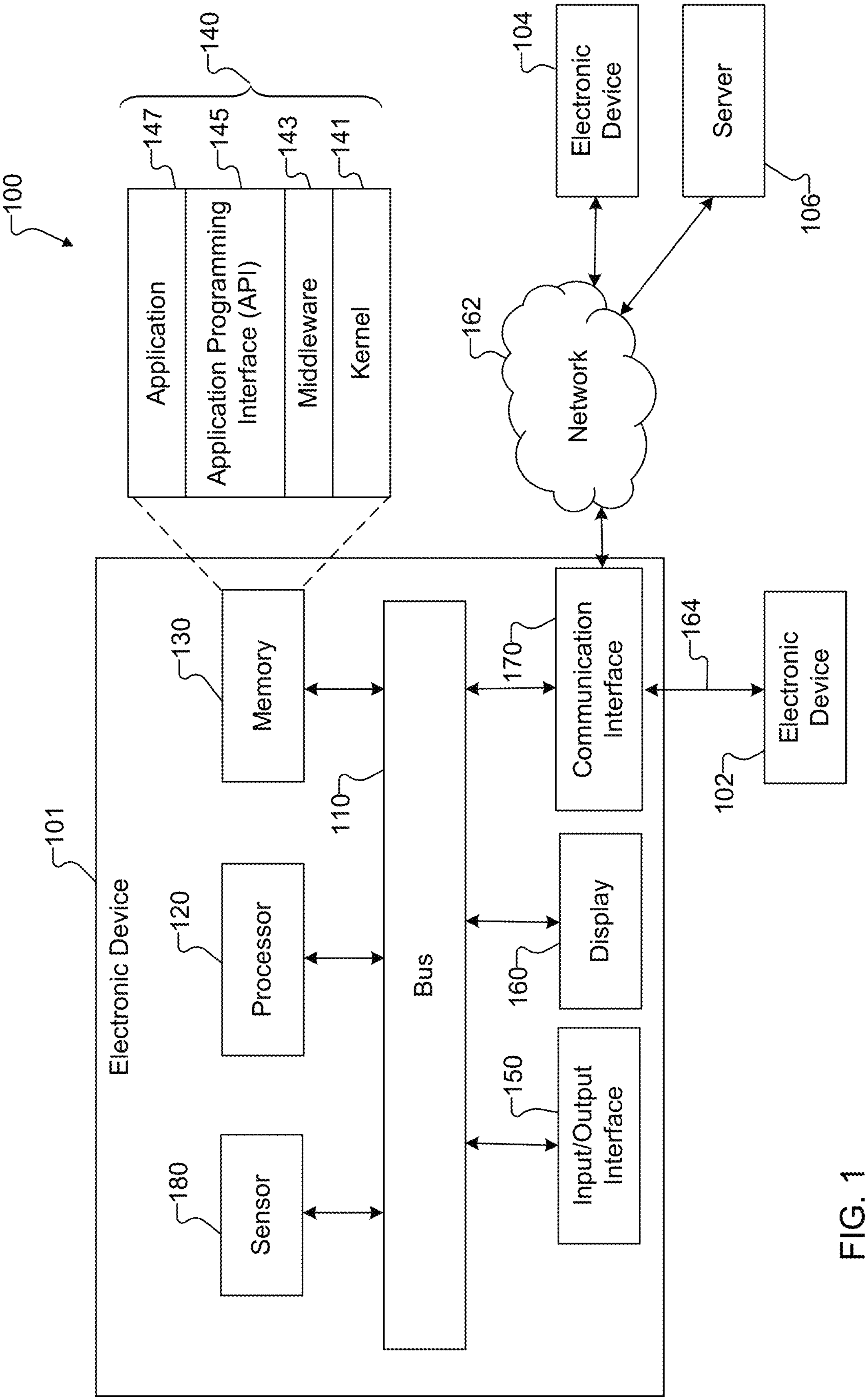
FIG. 1 illustrates an example network configuration including an electronic device in accordance with this disclosure.

FIGS. 1 through 15, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, extended reality (XR) systems are becoming more and more popular over time, and numerous applications have been and are being developed for XR systems. Some XR systems (such as augmented reality or "AR" systems and mixed reality or "MR" systems) can enhance a user's view of his or her current environment by overlaying digital content (such as information or virtual objects) over the user's view of the current environment. For example, some XR systems can often seamlessly blend virtual objects generated by computer graphics with real-world scenes.

An optical see-through (OST) XR system generally allows a user to view his or her environment directly, where light from the user's environment is passed to the user's eyes. Digital content can be superimposed onto the user's view of the environment using one or more panels or other structures through which the light from the user's environment passes. In contrast, a video see-through (VST) XR system (also called a "passthrough" XR system) generally uses see-through cameras to capture images of a user's environment. Digital content can be blended with the captured images, and the mixed images are displayed to the user for viewing. Both approaches can provide immense contextual extended reality experiences for users.

Mask generation is often a useful or desirable function performed by VST XR systems, such as to support scene reconstruction and recognition. For example, when blending digital objects or other digital content with captured images of a scene, it may be useful or desirable to avoid superimposing the digital content over one or more types of objects within the scene or to superimpose the digital content over one or more types of objects within the scene. Unfortunately, current segmentation algorithms often produce segmentation masks of poor quality. A segmentation mask typically represents a mask having pixel values that indicate which pixels in one or more image frames are associated with different objects within a scene. For instance, in an image of an indoor scene, a segmentation mask may identify which pixels in the image are associated with windows, furniture, plants, walls, floors, or other types of objects. Current segmentation algorithms can produce segmentation masks having incomplete or inaccurate boundaries of objects or other artifacts. Among other things, these artifacts make it possible for a VST XR system to superimpose digital content over portions of objects that should not be occluded or otherwise make it more difficult for the VST XR system to properly superimpose digital content within images of scenes.

This disclosure provides various techniques for mask generation with object and scene segmentation for passthrough XR. As described in more detail below, during training of an object segmentation model (a machine learning model), first and second training image frames of a scene can be obtained, and features of the first training image frame can be extracted. The extracted features of the first training image frame can be provided as input to an object segmentation model being trained, and the object segmentation model can be configured to generate object segmentation predictions for objects in the scene and a depth or disparity map. The first training image frame can be reconstructed based on the depth or disparity map and the second training image frame. The object segmentation model can be updated based on the first training image frame and the reconstructed first training image frame.

During use of the trained object segmentation model, first and second image frames of a scene can be obtained. The first image frame can be provided as input to the object segmentation model, and where the object segmentation model has been trained to generate first object segmentation predictions for objects in the scene and a depth or disparity map based on the first image frame. Second object segmentation predictions for the objects in the scene can be generated based on the second image frame, and boundaries of the objects in the scene can be determined based on the first and second object segmentation predictions. A virtual view for presentation on a display of an XR device can be generated based on the boundaries of the objects in the scene.

As described below, these techniques may support the generation of segmentation masks based on panoptic segmentation, which refers to the combined tasks of semantic segmentation and instance segmentation. In other words, these techniques can allow for the generation of a segmentation mask that identifies both (i) objects within a scene and (ii) the types of objects identified within the scene. These techniques may use an efficient algorithm to perform object and scene segmentation. In some cases, depth information can be applied to the segmentation processes without requiring depth ground truth data for machine learning model training, which can provide convenience and lead to more accurate segmentation results. These techniques can also use an efficient approach for boundary refinement in order to generate completed object and scene regions. These completed object and scene regions can be used for generating more accurate segmentation masks. As a result, these techniques provide an efficient approach for segmenting objects and scenes captured using see-through cameras of XR devices and can apply depth information in order to achieve better segmentation results, perform boundary refinement, and complete and enhance segmented regions.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, and a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), a graphics processor unit (GPU), or a neural processing unit (NPU). The processor 120 is able to perform control on at least one of the other components of the electronic device 101 and/or perform an operation or data processing relating to communication or other functions. As described below, the processor 120 may perform one or more functions related to mask generation with object and scene segmentation for passthrough XR.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may include one or more applications that, among other things, perform mask generation with object and scene segmentation for passthrough XR. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The wireless communication is able to use at least one of, for example, WiFi, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, the sensor(s) 180 include one or more cameras or other imaging sensors, which may be used to capture images of scenes. The sensor(s) 180 can also include one or more buttons for touch input, one or more microphones, a depth sensor, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. Moreover, the sensor(s) 180 can include one or more position sensors, such as an inertial measurement unit that can include one or more accelerometers, gyroscopes, and other components. In addition, the sensor(s) 180 can include a control circuit for controlling at least one of the sensors included here. Any of these sensor(s) 180 can be located within the electronic device 101.

In some embodiments, the electronic device 101 can be a wearable device or an electronic device-mountable wearable device (such as an HMD). For example, the electronic device 101 may represent an XR wearable device, such as a headset or smart eyeglasses. In other embodiments, the first external electronic device 102 or the second external electronic device 104 can be a wearable device or an electronic device-mountable wearable device (such as an HMD). In those other embodiments, when the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described below, the server 106 may perform one or more functions related to mask generation with object and scene segmentation for passthrough XR.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
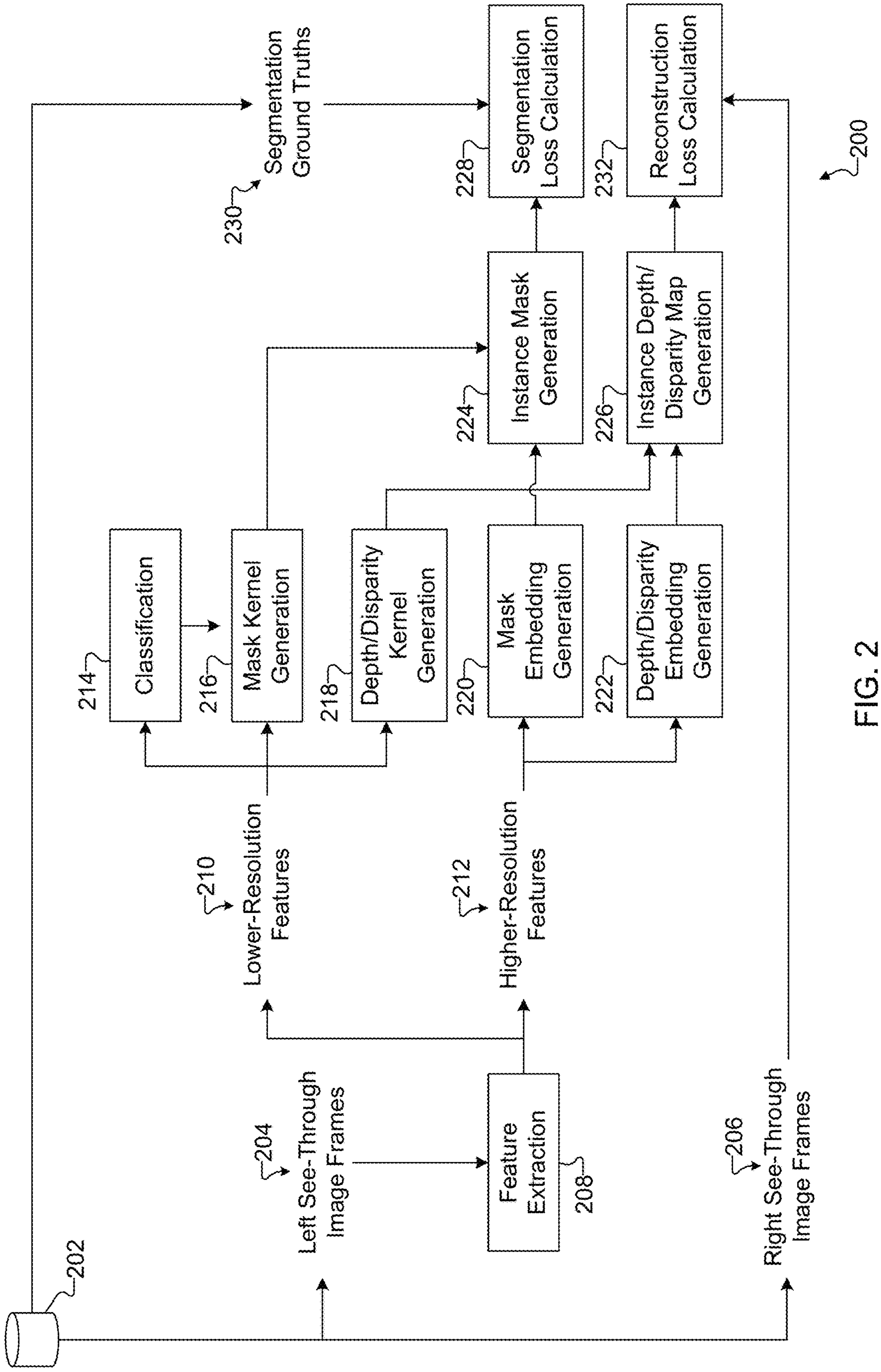
FIG. 2 illustrates an example architecture for training an object segmentation model to support mask generation with object and scene segmentation for passthrough extended reality (XR) in accordance with this disclosure.

FIG. 2 illustrates an example architecture 200 for training an object segmentation model to support mask generation with object and scene segmentation for passthrough XR in accordance with this disclosure. For ease of explanation, the architecture 200 of FIG. 2 is described as being implemented using the server 106 in the network configuration 100 of FIG. 1. However, the architecture 200 may be implemented using any other suitable device(s) (such as the electronic device 101) and in any other suitable system(s).

As shown in FIG. 2, the architecture 200 includes or has access to a training data store 202. The training data store 202 stores training data that can be used to train one or more object segmentation models. The training data store 202 includes any suitable structure configured to store and facilitate retrieval of data. In some cases, the training data store 202 may be local to the other components of the architecture 200, such as when the training data store 202 is maintained by the same entity that is training an object segmentation model. In other cases, the training data store 202 may be remote from the other components of the architecture 200, such as when the training data store 202 is maintained by one entity and the training data is obtained by another entity that is training an object segmentation model. The training data can represent labeled or annotated training images with known segmentations of objects captured within the training images.

In this example, the training data store 202 provides left see-through image frames 204 and right see-through image frames 206. The image frames 204 and 206 form multiple stereo image pairs, meaning a left see-through image frame 204 is associated with a right see-through image frame 206 and both represent images of a common scene that are captured from slightly different positions. Note that these image frames 204 and 206 are referred to as left and right merely for convenience. Each image frame 204 and 206 represents an image of a scene having a known segmentation. Each image frame 204 and 206 can have any suitable resolution and dimensions. In some cases, for instance, each image frame 204 and 206 may have a 2K, 3K, or 4K resolution. Each image frame 204 and 206 can also include image data in any suitable format. In some embodiments, for example, each image frame 204 and 206 includes RGB image data, which typically includes image data in three color channels (namely red, green, and blue color channels). However, each image frame 204 and 206 may include image data having any other suitable resolution, form, or arrangement.

The left see-through image frames 204 are provided to a feature extraction function 208, which generally operates to extract specific features from the image frames 204. For example, the feature extraction function 208 may include one or more convolution layers, other neural network layers, or other machine learning layers that process image data in order to identify specific features that the machine learning layers have been trained to recognize. In this example, the feature extraction function 208 is configured to generate lower-resolution features 210 (which may also be referred to as "single stage" features in some embodiments) and higher-resolution features 212. As the names imply, the features 212 have a higher resolution relative to the features 210. For instance, the higher-resolution features 212 may have a resolution matching the resolution of the image frames 204, while the lower-resolution features 210 may have a 600×600 resolution or other lower resolution. In some cases, the feature extraction function 208 may generate the higher-resolution features 212 and perform down-sampling to generate the lower-resolution features 210. However, the lower-resolution features 210 and the higher-resolution features 212 may be produced in any other suitable manner.

The lower-resolution features 210 are provided to a classification function 214, a mask kernel generation function 216, and a depth or disparity kernel generation function 218. The classification function 214 generally operates to process the lower-resolution features 210 in order to identify and classify objects captured in the left see-through image frames 204. For example, the classification function 214 may analyze the lower-resolution features 210 in order to (i) detect one or more objects within each left see-through image frame 204 and (ii) classify each detected object as one of multiple object classes or types. The classification function 214 can use any suitable technique to detect and classify objects in images. Various classification algorithms are known in the art, and additional classification algorithms are sure to be developed in the future. This disclosure is not limited to any specific techniques for detecting and classifying objects in images.

The mask kernel generation function 216 generally operates to process the lower-resolution features 210 and the classification results from the classification function 214 in order to generate mask kernels for different objects detected within the left see-through image frames 204. Each mask kernel can represent an initial lower-resolution mask identifying a boundary of the associated object within the associated left see-through image frame 204. The mask kernel generation function 216 can use any suitable technique to generate mask kernels associated with objects in image frames. In some cases, for example, the mask kernel generation function 216 may include one or more convolution layers trained to convolute the lower-resolution features 210 in order to generate the mask kernels.

The depth or disparity kernel generation function 218 generally operates to process the lower-resolution features 210 in order to generate depth or disparity kernels for different objects detected within the left see-through image frames 204. Each depth or disparity kernel can represent an initial lower-resolution estimate of one or more depths or disparities of the associated object within the associated left see-through image frame 204. As described below, depth and disparity are related, so knowledge of disparity values can be used to generate depth values (or vice versa). The depth or disparity kernel generation function 218 can use any suitable technique to generate depth or disparity kernels associated with objects in image frames. In some cases, for example, the depth or disparity kernel generation function 218 may include one or more convolution layers trained to convolute the lower-resolution features 210 in order to generate the depth or disparity kernels.

The higher-resolution features 212 are provided to a mask embedding generation function 220 and a depth or disparity embedding generation function 222. The mask embedding generation function 220 generally operates to process the higher-resolution features 212 in order to create mask embeddings, which can represent embeddings of the higher-resolution features 212 within a mask embedding space associated with the left see-through image frames 204. The mask embedding space represents an embedding space in which masks defining object boundaries can be defined at higher resolutions. Similarly, the depth or disparity embedding generation function 222 generally operates to process the higher-resolution features 212 in order to create depth or disparity embeddings, which can represent embeddings of the higher-resolution features 212 within a depth or disparity embedding space associated with the left see-through image frames 204. The depth or disparity embedding space represents an embedding space in which depths or disparities can be defined at higher resolutions. Each of the mask embedding generation function 220 and the depth or disparity embedding generation function 222 can use any suitable technique to generate embeddings within an associated embedding space.

The mask kernels generated by the mask kernel generation function 216 and the mask embeddings generated by the mask embedding generation function 220 are provided to an instance mask generation function 224, which generally operates to produce instance masks associated with different objects in the left see-through image frames 204. Each instance mask represents a higher-resolution mask identifying a boundary of the associated object within the associated left see-through image frame 204. For instance, the mask embedding generation function 220 may use a mask kernel generated by the mask kernel generation function 216 for a particular object in order to identify a subset of the mask embeddings generated by the mask embedding generation function 220 associated with that particular object.

Similarly, the depth or disparity kernels generated by the depth or disparity kernel generation function 218 and the depth or disparity embeddings generated by the depth or disparity embedding generation function 222 are provided to an instance depth or disparity map generation function 226, which generally operates to produce instance depth or disparity maps associated with different objects in the left see-through image frames 204. Each instance depth or disparity map represents a higher-resolution estimate of one or more depths or disparities of the associated object within the associated left see-through image frame 204. For instance, the instance depth or disparity map generation function 226 can use a depth or disparity kernel generated by the depth or disparity kernel generation function 218 for a particular object in order to identify a subset of the depth or disparity embeddings generated by the depth or disparity embedding generation function 222 associated with that particular object. The instance depth or disparity maps associated with each left see-through image frame 204 can collectively represent a depth or disparity map associated with all detected objects within that left see-through image frame 204.

The various functions 214-226 described above can represent functions implemented using or performed by an object segmentation model, which represents a machine learning model. Thus, various weights or other hyperparameters of the object segmentation model can be adjusted during the training that is performed using the architecture 200. In machine learning model training, a loss function is often used to calculate a loss for the machine learning model, where the loss is identified based on differences or errors between (i) the actual outputs or other values generated by the machine learning model and (ii) the expected or desired outputs or other values that should have been generated by the machine learning model. One goal of machine learning model training is typically to minimize the loss for the machine learning model by adjusting the weights or other hyperparameters of the machine learning model. For example, assume a loss function is defined as follows.

$$L = F\text{ (predicted value, actual value, hyperparameters)} \quad (1)$$

Example types of loss functions F( ) can include cross-entropy loss, log-likelihood loss, mean squared loss, and mean absolute loss. Here, predicted value represents the value generated by the machine learning model, actual value represents the actual value (ground truth data) provided by training samples, and hyperparameters represent the weights or other hyperparameters of the machine learning model. The loss can be minimized using an optimization algorithm to obtain optimal weights or other hyperparameters for the machine learning model, which may be expressed as follows.

$$minL = \min_{hyperparameters} F\text{ (predicted value, actual value, hyperparameters)} \quad (2)$$

The minimization algorithm can minimize the loss by adjusting the hyperparameters, and optimal hyperparameters can be obtained when the minimum loss is reached. At that point, the machine learning model can be assumed to generate accurate outputs.

In the example of FIG. 2, the loss function that is used to train the object segmentation model represents a combination of two losses. One of those losses is referred to as a segmentation loss, which relates to how well the object segmentation model segments objects or identifies boundaries of objects captured in the image frames 204 and 206. Here, the segmentation loss is determined using a segmentation loss calculation function 228, which compares the instance masks produced by the instance mask generation function 224 and segmentation ground truths 230. As described above, the instance masks produced by the instance mask generation function 224 represent estimated boundaries of objects contained in the left see-through image frames 204. The segmentation ground truths 230 represent known segmentations of the left see-through image frames 204, meaning the segmentation ground truths 230 identify the actual or correct object segmentations that should have been generated by the object segmentation model. The segmentation loss calculation function 228 can therefore compare the object segmentations as defined by the instance masks produced by the instance mask generation function 224 to the correct object segmentations as defined by the segmentation ground truths 230. Errors between the two can be used to calculate a segmentation loss for the object segmentation model.

In this example, the training data store 202 may lack ground truth data related to depths or disparities of the image frames 204 and 206. That is, the training data store 202 may lack correct depth or disparity maps that should be generated by the object segmentation model. This may often be the case since accurately identifying depths in training image frames can be very time-consuming and costly. However, it is possible to determine how well the object segmentation model estimates disparities or depths by using the instance depth or disparity maps produced by the instance depth or disparity map generation function 226 to reconstruct left see-through image frames 204 using right see-through image frames 206. As described below, when depths or disparities are known, it is possible to project or otherwise transform one image frame associated with a first viewpoint into another image frame associated with a different viewpoint. Thus, for instance, when depths or disparities in a scene are known, it is possible to convert an image frame captured at the image plane of a right imaging sensor into an image frame at the image plane of a left imaging sensor (or vice versa).

Because of that, in FIG. 2, the other loss used to train the object segmentation model is referred to as a reconstruction loss, which relates to how well the object segmentation model generates depth or disparity values used to reconstruct the left see-through image frames 204 using the right see-through image frames 206. In this example, the reconstruction loss is determined using a reconstruction loss calculation function 232, which projects or otherwise transforms the right see-through image frames 206 based on the depth or disparity values contained in the instance depth or disparity maps produced by the instance depth or disparity map generation function 226. This results in the creation of reconstructed left see-through image frames. If the instance depth or disparity maps produced by the instance depth or disparity map generation function 226 are accurate, there should be fewer errors between the reconstructed left see-through image frames and the actual left see-through image frames 204. If the instance depth or disparity maps produced by the instance depth or disparity map generation function 226 are not accurate, there should be more errors between the reconstructed left see-through image frames and the actual left see-through image frames 204. The reconstruction loss calculation function 232 can therefore compare the reconstructed left see-through image frames to the actual left see-through image frames 204. Errors between the two can be used to calculate a reconstruction loss for the object segmentation model.

One possible advantage of this approach is that ground truth depth or disparity information is not needed or required. That is, the object segmentation model can be trained without using ground truth depth or disparity information associated with the image frames 204 and 206. As a result, this can simplify the training of the object segmentation model and reduce costs associated with the training. However, this is not necessarily required. For example, the training data store 202 may include ground truth depth or disparity values, in which case the reconstruction loss calculation function 232 may identify errors between the instance depth or disparity maps produced by the instance depth or disparity map generation function 226 and the ground truth depth or disparity values.

Although FIG. 2 illustrates one example of an architecture 200 for training an object segmentation model to support mask generation with object and scene segmentation for passthrough XR, various changes may be made to FIG. 2. For example, various components and functions in FIG. 2 may be combined, further subdivided, replicated, omitted, or rearranged and additional components and functions may be added according to particular needs. As a particular example, while different operations are shown as being performed using left and right see-through image frames 204 and 206, these operations may be reversed. In other words, the right see-through image frames 206 may be provided to the feature extraction function 208, while the left see-through image frames 204 may be used for reconstruction purposes.

Figure 3:
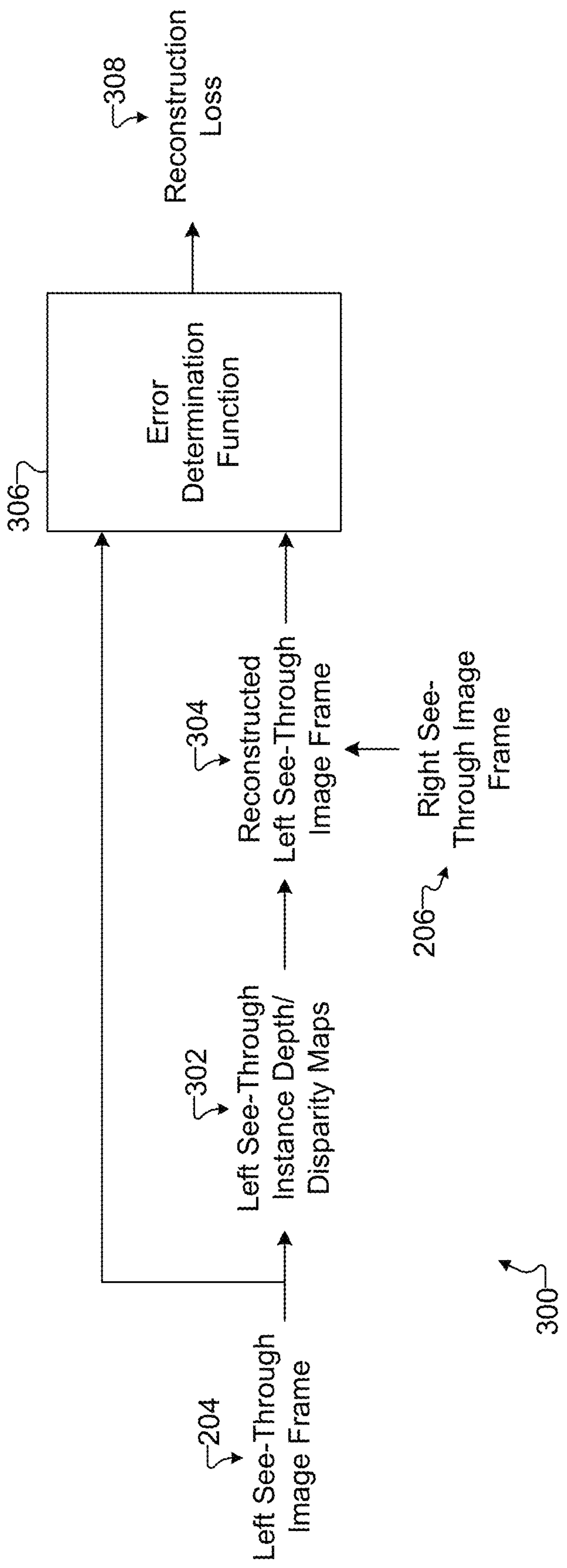
FIG. 3 illustrates an example process for determining a reconstruction loss within the architecture of FIG. 2 in accordance with this disclosure.

FIG. 3 illustrates an example process 300 for determining a reconstruction loss within the architecture 200 of FIG. 2 in accordance with this disclosure. More specifically, the process 300 shown in FIG. 3 can involve the use of the reconstruction loss calculation function 232 described above. One possible goal here can be to calculate a reconstruction loss during object segmentation model training in order to apply depth or disparity information during the training, which can help to improve the segmentation process and lead to the generation of more accurate segmentation results.

As noted above, one way to incorporate reconstruction loss into object segmentation model training is to construct a depth or disparity map, apply the depth or disparity map to guide the segmentation process, and determine the reconstruction loss based on ground truth depth or disparity data. Feedback generated with the reconstruction loss can be used during the model training process in order to adjust the object segmentation model being trained, which ideally results in lower losses over time. In these embodiments, the model training process would need both (i) the segmentation ground truths 230 and (ii) the ground truth depth or disparity data. As described above, ground truth depth or disparity data may not be available since (among other reasons) it can be difficult to obtain in various circumstances.

The process 300 shown in FIG. 3 does not require ground truth depth or disparity data in order to identify the reconstruction loss. Rather, the process 300 shown in FIG. 3 constructs depth or disparity information and applies the depth or disparity information in order to create reconstructed image frames. The reconstructed image frames are compared to actual image frames in order to determine the reconstruction loss. Among other things, this allows for the determination of reconstruction losses using stereo image pairs that are spatially consistent with one another. As a result, the process 300 uses depth or disparity information but does not need ground truth depth or disparity data during model training.

As shown in FIG. 3, each left see-through image frame 204 can be used to generate one or more instance depth or disparity maps 302, which can be produced using the instance depth or disparity map generation function 226 as described above. The one or more instance depth or disparity maps 302 are used to generate a reconstructed left see-through image frame 304, which can be accomplished by projecting, warping, or otherwise transforming the right see-through image frame 206 associated with the left see-through image frame 204 based on the one or more instance depth or disparity maps 302. Again, when depths or disparities associated with a scene are known, it is possible to transform an image frame of the scene at one image plane into a different image frame of the scene at a different image plane based on the depths or disparities.

Here, the reconstruction loss calculation function 232 can take the right see-through image frame 206 and generate a reconstructed version of the left see-through image frame 204 based on the depths or disparities generated by the instance depth or disparity map generation function 226. This results in the reconstructed left see-through image frame 304 and the left see-through image frame 204 forming a stereo image pair having known consistencies in their depths or disparities. Any differences between the image frames 204 and 304 can therefore be due to inaccurate disparity or depth estimation by the object segmentation model. As a result, an error determination function 306 can identify the differences between the image frames 204 and 304 in order to calculate a reconstruction loss 308, and the reconstruction loss 308 can be used to adjust the object segmentation model during training. For instance, the reconstruction loss 308 can be combined with the segmentation loss as determined by the segmentation loss calculation function 228, and the combined loss can be compared to a threshold. The object segmentation model can be adjusted during training until the combined loss falls below the threshold or until some other criterion or criteria are met (such as a specified number of training iterations have occurred or a specified amount of training time has elapsed).

Although FIG. 3 illustrates one example of a process 300 for determining a reconstruction loss within the architecture 200 of FIG. 2, various changes may be made to FIG. 3. For example, various components and functions in FIG. 3 may be combined, further subdivided, replicated, omitted, or rearranged and additional components and functions may be added according to particular needs. Also, other or additional loss values may be calculated and used during training of an object segmentation model.

Figure 4:
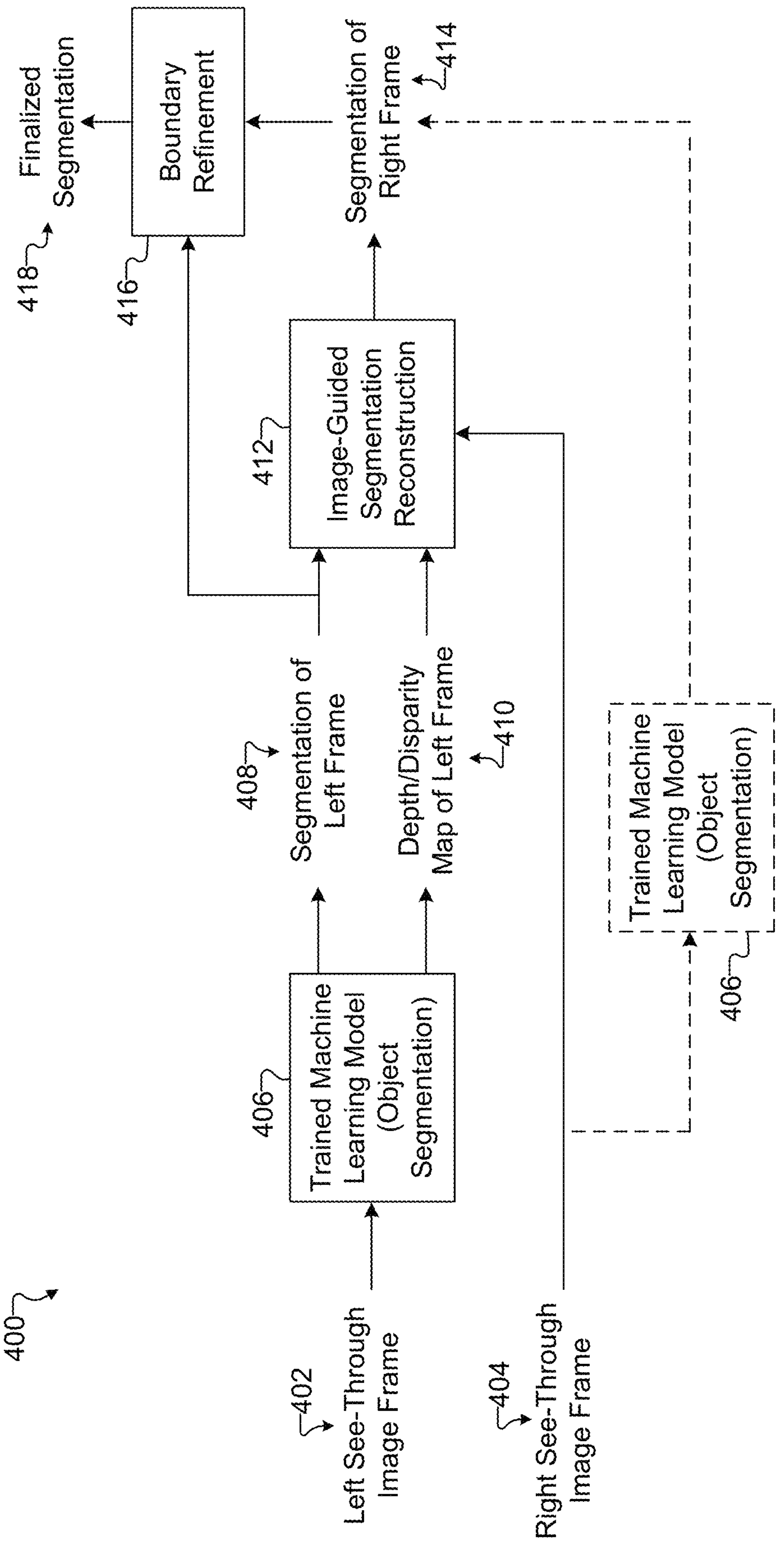
FIG. 4 illustrates an example architecture for using an object segmentation model that supports mask generation with object and scene segmentation for passthrough XR in accordance with this disclosure.

FIG. 4 illustrates an example architecture 400 for using an object segmentation model that supports mask generation with object and scene segmentation for passthrough XR in accordance with this disclosure. For ease of explanation, the architecture 400 of FIG. 4 is described as being implemented using the electronic device 101 in the network configuration 100 of FIG. 1. However, the architecture 400 may be implemented using any other suitable device(s) (such as the server 106) and in any other suitable system(s).

As shown in FIG. 4, the architecture 400 receives a left see-through image frame 402 and a right see-through image frame 404. These image frames 402 and 404 form a stereo image pair, meaning the image frames 402 and 404 represent images of a common scene that are captured from slightly different positions (again referred to as left and right positions merely for convenience). In some cases, the image frames 402 and 404 may be captured using imaging sensors 180 of an electronic device 101, such as when the image frames 402 and 404 are captured using imaging sensors 180 of an XR headset or other XR device. Each image frame 402 and 404 can have any suitable resolution and dimensions. In some cases, for instance, each image frame 402 and 404 may have a 2K, 3K, or 4K resolution depending on the capabilities of the imaging sensors 180. Each image frame 402 and 404 can also include image data in any suitable format. In some embodiments, for example, each image frame 402 and 404 includes RGB image data, which typically includes image data in red, green, and blue color channels. However, each image frame 402 and 404 may include image data having any other suitable resolution, form, or arrangement.

The left see-through image frame 402 is provided to a trained machine learning model 406. The trained machine learning model 406 represents an object detection model, which may have been trained using the architecture 200 described above. The trained machine learning model 406 is used to generate a segmentation 408 of the left image frame 402 and a depth or disparity map 410 of the left image frame 402. The segmentation 408 of the left image frame 402 identifies different objects contained in the left see-through image frame 402. For example, the segmentation 408 of the left image frame 402 may include or be formed by the various instance masks produced by the instance mask generation function 224 of the trained machine learning model 406. The segmentation 408 of the left image frame represents object segmentation predictions associated with the left image frame 402. The depth or disparity map 410 of the left image frame 402 identifies depths or disparities associated with the scene imaged by the left see-through image frame 402. The depth or disparity map 410 of the left image frame 402 may include or be formed by the various instance depth or disparity maps produced by the instance depth or disparity map generation function 226 of the trained machine learning model 406.

Object segmentation predictions associated with the right image frame 404 may be produced in different ways. For example, in some cases, an image-guided segmentation reconstruction function 412 can be used to generate a segmentation 414 of the right image frame 404. In these embodiments, the image-guided segmentation reconstruction function 412 can project or otherwise transform the segmentation 408 of the left image frame 402 to produce the segmentation 414 of the right image frame 404. As a particular example, the image-guided segmentation reconstruction function 412 can project the segmentation 408 of the left image frame 402 onto the right image frame 404. This transformation can be based on the depth or disparity map 410 of the left image frame 402. This can be similar to the process described above with respect to the reconstruction loss calculation, but here the transformation is used to apply the segmentation 408 of the left image frame 402 to the right image frame 404. This approach supports spatial consistency between the segmentation 408 of the left image frame 402 and the segmentation 414 of the right image frame 404. This approach also simplifies the segmentation process and saves computational power since the trained machine learning model 406 is used to process one but not both image frames 402 and 404. However, this is not necessarily required. In other embodiments, for instance, the trained machine learning model 406 may also be used to process the right image frame 404 and generate the segmentation 414 of the right image frame 404.

A boundary refinement function 416 generally operates to process the left and right segmentations 408 and 414 of the left and right image frames 402 and 404. The boundary refinement function 416 can be used to refine and correct the left and right segmentations 408 and 414 where needed, which can lead to the generation of a finalized segmentation 418 for the image frames 402 and 404. For example, the boundary refinement function 416 may detect regions where objects overlap and determine appropriate boundaries for the overlapping objects (possibly based on knowledge of specific types of objects or prior experience). The boundary refinement function 416 may also clarify and verify the segmentation results in order to provide noise reduction and improved results. The finalized segmentation 418 may represent or include at least one segmentation mask that identifies or isolates one or more objects within the image frames 402 and 404. The finalized segmentation 418 can be used in any suitable manner, such as by processing the finalized segmentation 418 as shown in FIG. 5 and described below.

As can be seen in FIG. 4, it is possible to obtain both the segmentation 408 and the depth or disparity map 410 of an image frame simultaneously. This can be very useful in certain applications, such as scene reconstruction and recognition in see-through XR applications. As a particular example, this can be very useful in applications where a physical keyboard is captured in the image frames 402 and 404. As described below, it is possible for an XR system to identify input from a user by recognizing a physical keyboard and identifying which buttons of the physical keyboard are depressed by the user.

Although FIG. 4 illustrates one example of an architecture 400 for using an object segmentation model that supports mask generation with object and scene segmentation for passthrough XR, various changes may be made to FIG. 4. For example, various components and functions in FIG. 4 may be combined, further subdivided, replicated, omitted, or rearranged and additional components and functions may be added according to particular needs. As a particular example, while different operations are shown as being performed using left and right see-through image frames 402 and 404, these operations may be reversed. In other words, the right see-through image frame 404 may be provided to the trained machine learning model 406, while the left see-through image frame 402 may be provided to the image-guided segmentation reconstruction function 412.

Figure 5:
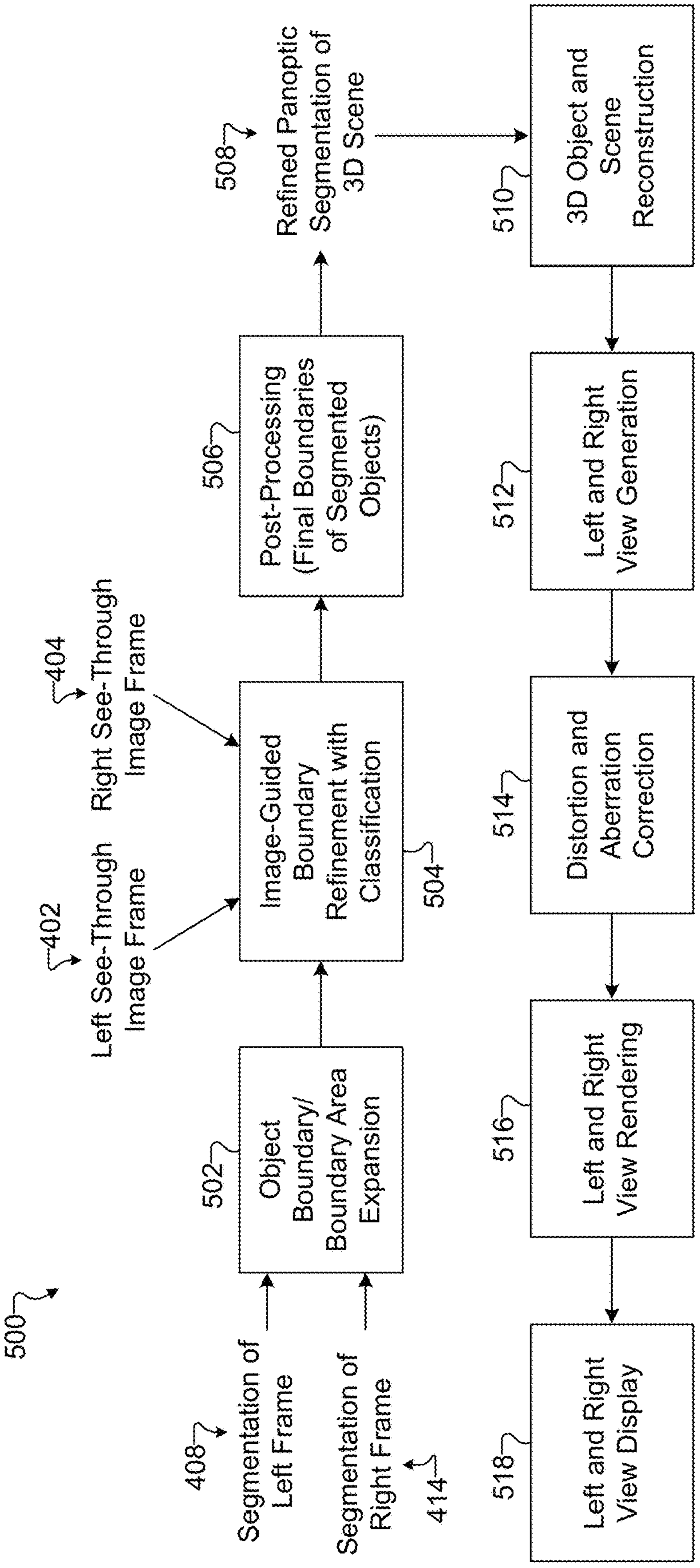
FIGS. 5 and 6 illustrate an example process for boundary refinement and virtual view generation within the architecture of FIG. 4 in accordance with this disclosure.
Figure 6:
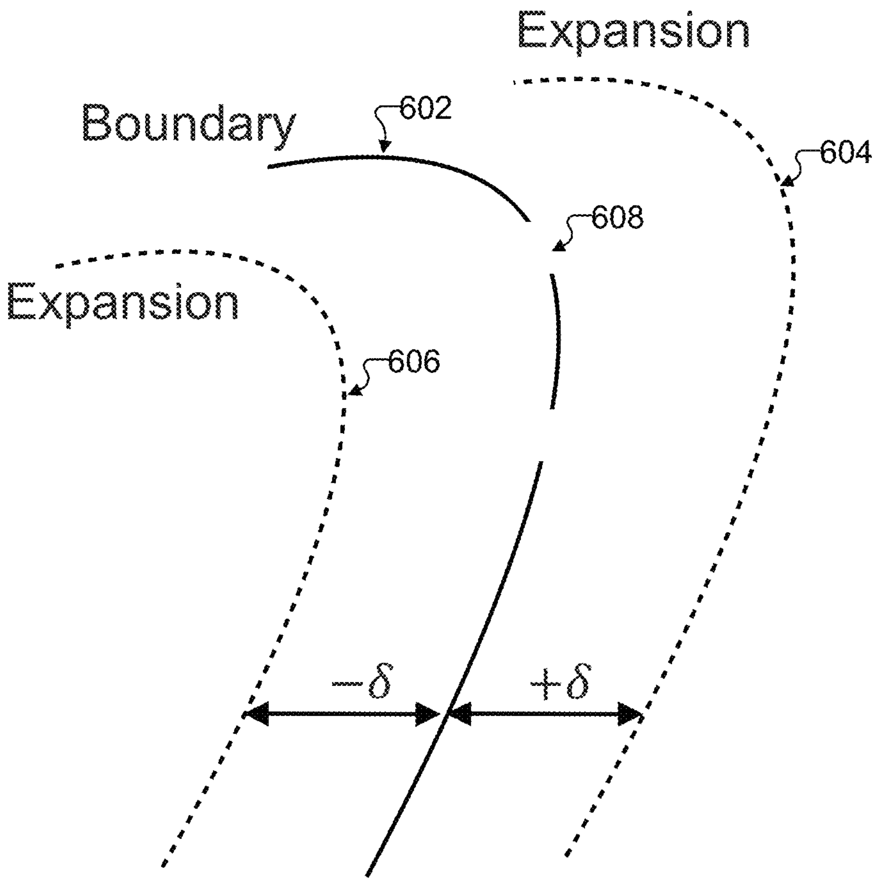

FIGS. 5 and 6 illustrate an example process 500 for boundary refinement and virtual view generation within the architecture 400 of FIG. 4 in accordance with this disclosure. More specifically, the process 500 shown in FIG. 5 can involve the use of the boundary refinement function 416 described above, along with additional functions for generating, rendering, and displaying virtual views of scenes. One possible goal of the boundary refinement here may be to finalize boundaries of detected objects and regions within a captured scene, which allows segmented areas to accurately represent the objects and regions in the scene.

As shown in FIG. 5, an object boundary extraction and boundary area expansion function 502 processes the segmentations 408 and 414 of the left and right image frames 402 and 404 in order to identify boundaries of objects captured in the image frames 402 and 404 and expand the identified boundaries. One example of this is shown in FIG. 6, where a boundary region includes a portion of a boundary 602 of a detected object that is identified within the image frames 402 and 404. This boundary region can be expanded to produce an expanded boundary region defined by two boundaries 604 and 606. The expanded boundary region defines a space in which the boundary on one object might intersect with the boundary of another object. Here, the boundary 602 is expanded by amounts $+\delta$ and $-\delta$ to produce the boundaries 604 and 606 defining the expanded boundary region. The object boundary extraction and boundary area expansion function 502 may use any suitable techniques to identify and expand boundary and boundary regions. For instance, each boundary may be identified based on the boundary of an object contained in the segmentations 408 and 414, and the expanded boundary region may be produced using fixed or variable values for $\delta$.

An image-guided boundary refinement with classification function 504 can be used to process the identified boundaries and boundary regions in order to correct certain issues with object segmentations. For example, the image-guided boundary refinement with classification function 504 may perform classification of pixels within the expanded boundary region defined by the boundaries 604 and 606 in order to complete one or more incomplete regions associated with at least one of the objects in the scene. That is, the image-guided boundary refinement with classification function 504 can determine which pixels in the expanded boundary region belong to which objects within the scene. This can be useful when multiple objects may be present within the expanded boundary region. Here, the image-guided boundary refinement with classification function 504 can use the original image frames 402 and 404 to support the boundary refinement. If multiple objects are present, the image-guided boundary refinement with classification function 504 can separate the objects (based on the classifications of the pixels in the expanded boundary region) in order to enhance and complete the boundaries of the objects. One example of this is described below with reference to FIGS. 9 through 11.

Note that when objects overlap, the image-guided boundary refinement with classification function 504 may be able to identify the boundary of the upper object and may or may not be able to estimate the boundary of the lower object. For example, in some cases, the boundary of the lower object may be estimated by (i) identifying one or more boundaries of one or more visible portions of the lower object and (ii) estimating one or more boundaries of one or more other portions of the lower object that are occluded by the upper object. The estimation of the boundary of an occluded portion of the lower object may be based on knowledge of specific types of objects or prior experience, such as when a particular type of object typically has a known shape. Two examples of this are described below with reference to FIGS. 12A through 13B.

At this point, at least one post-processing function 506 may be performed. For example, the at least one post-processing function 506 may be used to finalize boundaries of segmented objects by creating edge connections and modifying edge thicknesses to remove noise. As a particular example of this, a boundary 602 may include one or more gaps 608 as shown in FIG. 6, which can be due to any number of factors. Here, a post-processing function 506 may be performed to connect the segments of the boundary 602 and create a continuous boundary for the associated object. This can be performed for all objects in order to ensure that each object has a continuous boundary. The at least one post-processing function 506 may be used to create a refined panoptic segmentation 508, which represents a segmentation of a three-dimensional (3D) scene. The refined panoptic segmentation 508 here may represent the finalized segmentation 418 shown in FIG. 4.

The refined panoptic segmentation 508 may be used in any suitable manner. In this example, the refined panoptic segmentation 508 is provided to a 3D object and scene reconstruction function 510. The 3D object and scene reconstruction function 510 generally operates to process the refined panoptic segmentation 508 in order to generate 3D models of the scene and one or more objects within the scene as captured in the image frames 402 and 404. For example, in some cases, the refined panoptic segmentation 508 may be used to define one or more masks based on the boundaries of one or more objects in the scene. Among other things, the masks can help to separate individual objects in the scene from a background of the scene. The 3D object and scene reconstruction function 510 can also use the 3D models of the objects and scene to perform object and scene reconstruction, such as by reconstructing each object using that object's 3D model and separately reconstructing the background of the scene.

The reconstructed objects and scene can be provided to a left and right view generation function 512, which generally operates to produce left and right virtual views of the scene. For example, the left and right view generation function 512 may perform viewpoint matching and parallax correction in order to create virtual views to be presented to left and right eyes of a user. A distortion and aberration correction function 514 generally operates to process the left and right virtual views in order to correct for various distortions, aberrations, or other issues. As a particular example, the distortion and aberration correction function 514 may be used to pre-compensate the left and right virtual views for geometric distortions caused by display lenses of an XR device worn by the user. In this example, the user may typically view the left and right virtual views through display lenses of the XR device, and these display lenses can create geometric distortions due to the shape of the display lenses. The distortion and aberration correction function 514 can therefore pre-compensate the left and right virtual views in order to reduce or substantially eliminate the geometric distortions in the left and right virtual views as viewed by the user. As another particular example, the distortion and aberration correction function 514 may be used to correct for chromatic aberrations.

The corrected virtual views can be rendered using a left and right view rendering function 516, which can generate the actual image data to be presented to the user. The rendered views are presented on one or more displays of an XR device by a left and right view display function 518, such as via one or more displays 160 of the electronic device 101. Note that multiple separate displays 160 (such as left and right displays separately viewable by the eyes of the user) or a single display 160 (such as one where left and right portions of the display are separately viewable by the eyes of the user) may be used to present the rendered views. Among other things, this may allow the user to view a stream of transformed and integrated images from multiple see-through cameras, where the images are generated using a graphics pipeline performing the various functions described above.

Although FIGS. 5 and 6 illustrate one example of a process 500 for boundary refinement and virtual view generation within the architecture 400 of FIG. 4, various changes may be made to FIGS. 5 and 6. For example, various components and functions in FIG. 5 may be combined, further subdivided, replicated, omitted, or rearranged and additional components and functions may be added according to particular needs. Also, the boundary and boundary expansion shown in FIG. 6 are for illustration and explanation only and can easily vary based on (i) the boundary of an actual object in a scene and (ii) how the boundary is expanded.

It should be noted that the functions shown in or described with respect to FIGS. 2 through 6 can be implemented in an electronic device 101, 102, 104, server 106, or other device (s) in any suitable manner. For example, in some embodiments, at least some of the functions shown in or described with respect to FIGS. 2 through 6 can be implemented or supported using one or more software applications or other software instructions that are executed by the processor 120 of the electronic device 101, 102, 104, server 106, or other device(s). In other embodiments, at least some of the functions shown in or described with respect to FIGS. 2 through 6 can be implemented or supported using dedicated hardware components. In general, the functions shown in or described with respect to FIGS. 2 through 6 can be performed using any suitable hardware or any suitable combination of hardware and software/firmware instructions. Also, the functions shown in or described with respect to FIGS. 2 through 6 can be performed by a single device or by multiple devices. For example, the server 106 may implement the architecture 200 in order to train an object segmentation model, and the electronic device 101 may implement the architecture 400 in order to use the trained object segmentation model deployed to the electronic device 101 after training.

In various functions described above, a projection or other transformation of an image frame or segmentation is described as being performed from left to right (or vice versa) based on depth or disparity information. For example, the reconstruction loss calculation function 232 may project the right see-through image frames 206 based on the depth or disparity values contained in the instance depth or disparity maps produced by the instance depth or disparity map generation function 226. As another example, the image-guided segmentation reconstruction function 412 may project the segmentation 408 of the left image frame 402 onto the right image frame 404 based on the depth or disparity map 410 of the left image frame 402. The following now describes an example basis for how these projections or other transformations may occur.

Figure 7:
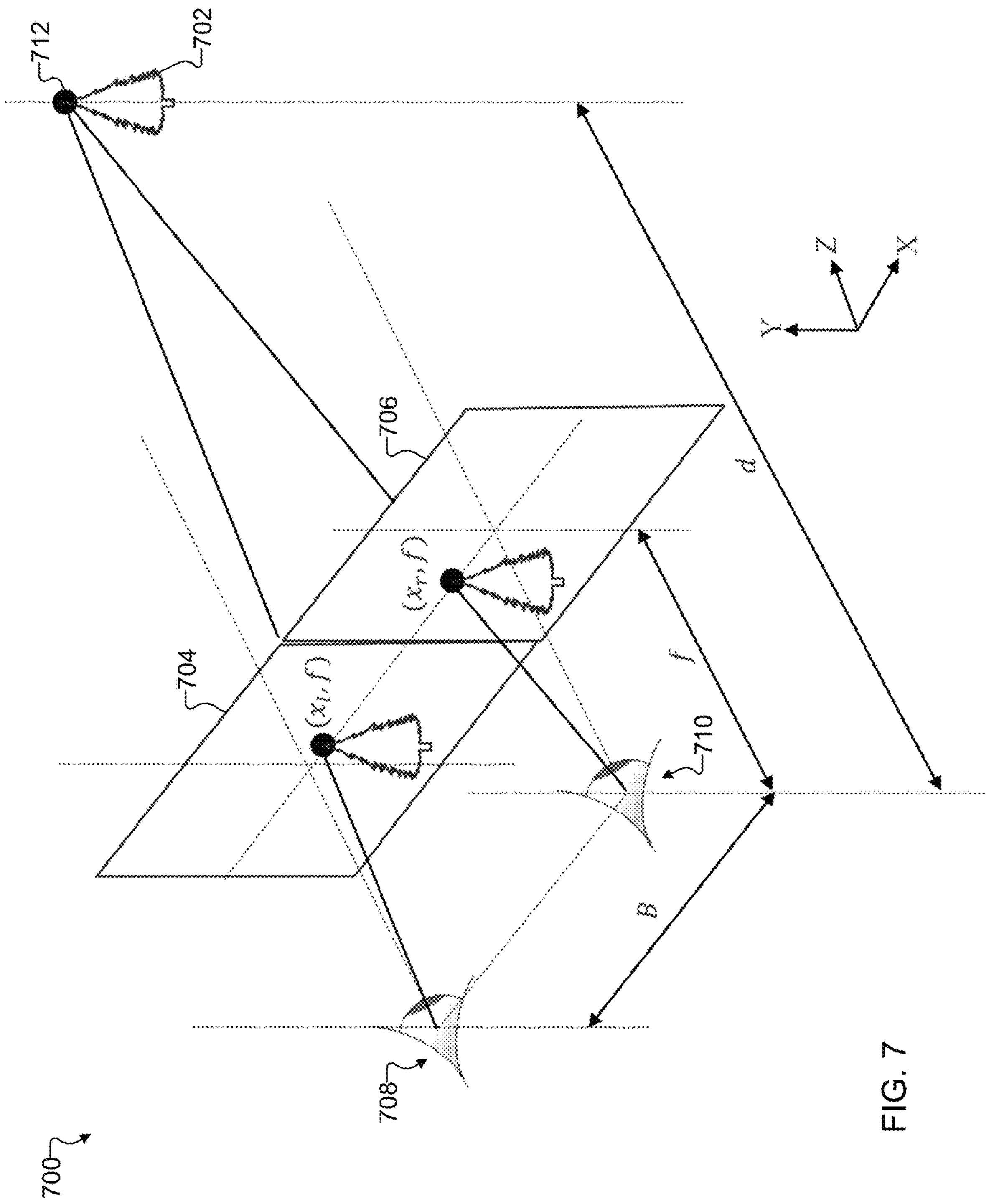
FIG. 7 illustrates an example relationship between segmentation results associated with a stereo image pair in accordance with this disclosure.

FIG. 7 illustrates an example relationship 700 between segmentation results associated with a stereo image pair in accordance with this disclosure. As shown in FIG. 7, an object 702 (which in this example represents a tree) is being captured in two image frames 704 and 706, which are associated with different image planes. The left image frame 704 may be viewed by a left eye 708 of a user, and the right image frame 706 may be viewed by a right eye 710 of the user. Here, B represents an inter-pupillary distance (IPD) between the user's eyes 708 and 710, f represents a focal length of the imaging sensors that capture the image frames 704 and 706, and d represents a depth associated with the object 702.

Disparity refers to the distance between two points in left and right image frames of a stereo image pair, where those two points correspond to the same point in a scene. For example, a point 712 of the object 702 appears at a location ($x_l$, f) in the left image frame 704, and the same point 712 of the object 702 appears at a location ($x_r$, f) in the right image frame 706. Based on this, it is possible to calculate disparity (p) as follows:

$$p = \frac{Bf}{d} = x_l - x_r \tag{3}$$

As a result, it can be shown that:

$$x_r = x_l - p = x_l - \frac{Bf}{d} \tag{4}$$

$$x_l = x_r + p = x_r + \frac{Bf}{d} \tag{5}$$

It is therefore possible to take pixel data at one image plane and convert that into pixel data at another image plane if depth or disparity values associated with the pixels are known.

Figure 8:
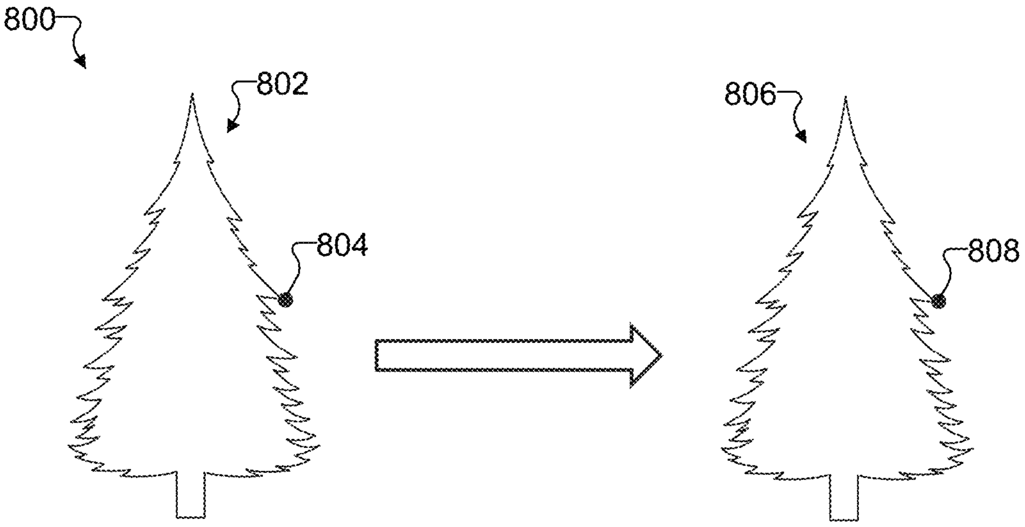
FIG. 8 illustrates an example image-guided segmentation reconstruction using stereo consistency in accordance with this disclosure.

FIG. 8 illustrates an example image-guided segmentation reconstruction 800 using stereo consistency in accordance with this disclosure. The reconstruction 800 shown in FIG. 8 may, for example, be performed by the image-guided segmentation reconstruction function 412 when generating a segmentation 414 of a right image frame 404 based on the segmentation 408 of a left image frame 402.

As shown in FIG. 8, a mask 802 of the object 702 may be generated as described above, such as by using the left image frame 704. The mask 802 is associated with or defined by various points 804, only one of which is shown here for simplicity. When depths or disparities associated with a scene are known, it is possible to convert the mask 802 of the object 702 for the left image frame 704 into a corresponding mask 806 for the right image frame 706. For instance, each point 804 can be converted into a corresponding point 808 using Equation (4) above. Alternatively, starting from the mask 806 for the right image frame 706 and reconstructing the mask 802 for the left image frame 704 can be done using Equation (5) above. As a result, it is possible to convert the segmentation 408 of the left image frame 402 into the segmentation 414 of the right image frame 404 (or vice versa) in FIG. 4 using this approach. This can result in the generation of segmentations 408 and 414 that are known to be spatially consistent with one another. This can also help to reduce the computation load needed to generate the segmentations 408 and 414 for different image frames 402 and 404, since the trained machine learning model 406 may only need to generate one of the segmentations 408 and 414.

Although FIG. 7 illustrates one example of a relationship 700 between segmentation results associated with a stereo image pair and FIG. 8 illustrates one example of an image-guided segmentation reconstruction 800 using stereo consistency, various changes may be made to FIGS. 7 and 8. For example, the scene being imaged here is for illustration only and can vary widely depending on the circumstances.

The ability to generate masks for objects captured in image frames may be used in a number of applications. The following are examples of applications in which this functionality may be used. However, note that these are non-limiting examples and that the ability to generate masks for objects captured in image frames may be used in any other suitable applications.

As a first example application, this functionality may be used for nearby object mask generation, which involves generating one or more masks for one or more objects that are near or otherwise closer to a VST XR headset or other VST XR device. The proximity of the nearby objects to the VST XR device may be due to movement of the objects, movement of the VST XR device (such as when a user walks around), or both. If and when any of the detected objects are determined to be too close to the VST XR device (such as based on a threshold distance) or approaching the VST XR device too rapidly (such as based on a threshold speed), a warning may be generated for a user of the VST XR device. The warning may represent a warning for the user to not hit a nearby object or crash into a nearby object.

As a second example application, this functionality may be used for mask generation used for 3D object reconstruction, which can involve reconstructing 3D objects detected in a scene captured using see-through cameras. Here, separate masks can be generated for separating objects in a foreground of the scene from the background of the scene. After reconstructing these objects, the 3D objects and background can be reprojected separately in order to generate high-quality final views efficiently.

As a third example application, this functionality may be used for keyboard mask generation, which can involve generating masks for physical keyboards detected within scenes. For example, as noted above, a physical keyboard may be captured in image frames, and an XR device can identify input from a user by recognizing the physical keyboard and identifying which buttons of the keyboard are depressed by the user. Here, a keyboard can be detected in image frames captured by an XR device. After the keyboard is captured in the image frames, the keyboard object can be segmented out, and a mask for the keyboard object can be generated. The XR device may then avoid rendering digital content that obscures any portion of the keyboard object. Using a depth or disparity map associated with the keyboard object, it is also possible to estimate which keys of the keyboard are depressed by a user and to use that input without a physical or wireless connection with the keyboard. Two examples of this use case are described below with reference to FIGS. 12A through 13B.

Figure 9:
FIGS. 9 through 11 illustrate example results obtainable using an object segmentation model that supports mask generation with object and scene segmentation for passthrough XR in accordance with this disclosure.
Figure 10:
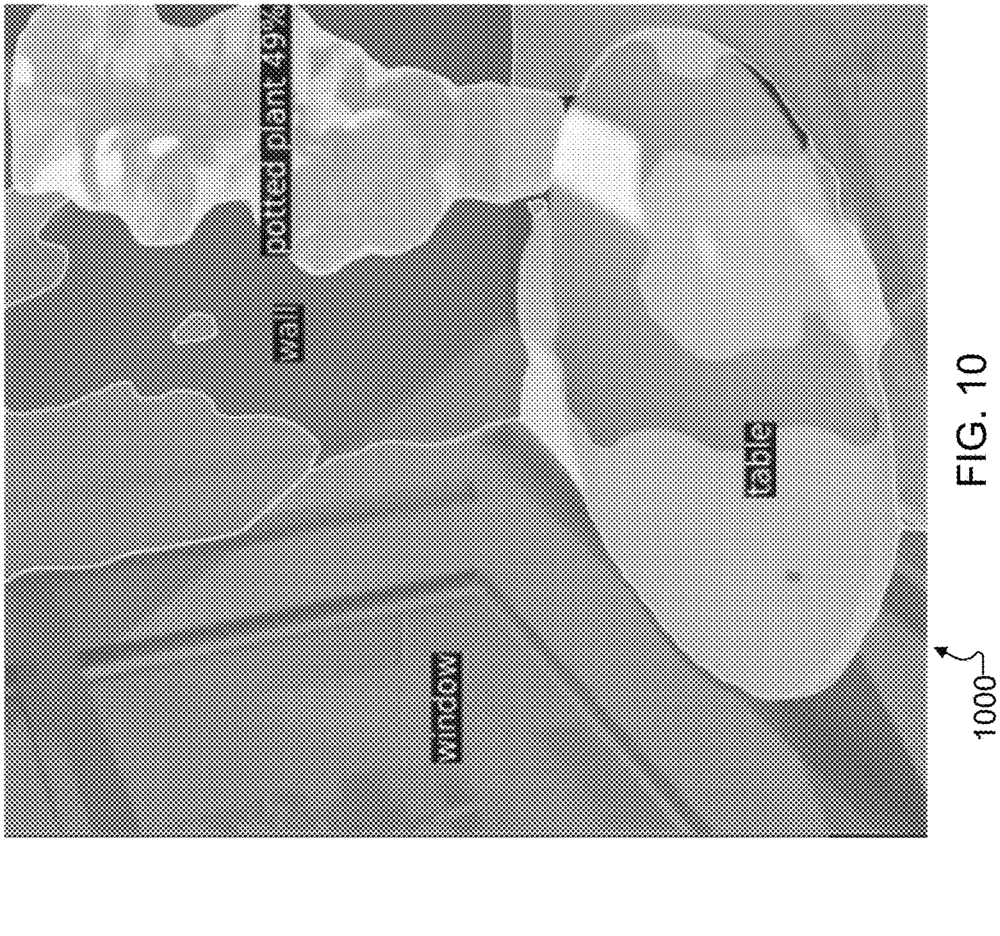
Figure 11:
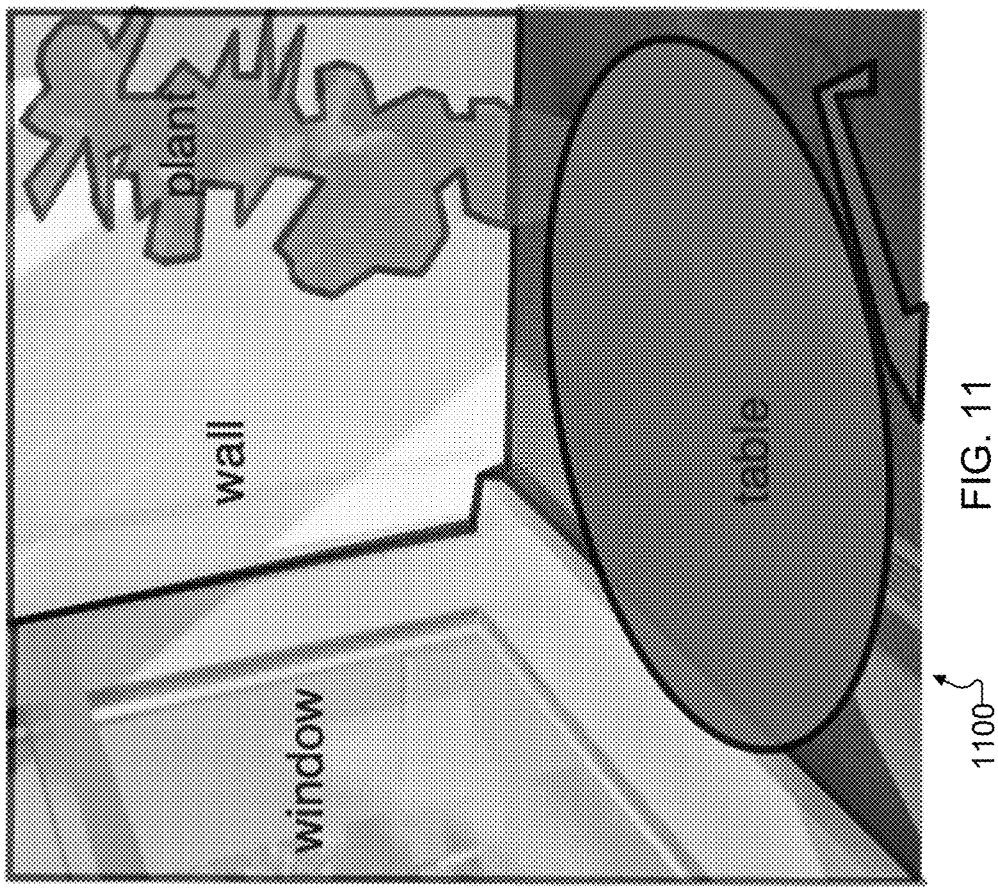

FIGS. 9 through 11 illustrate example results obtainable using an object segmentation model that supports mask generation with object and scene segmentation for pass-through XR in accordance with this disclosure. For ease of explanation, the results shown in FIGS. 9 through 11 are described as being obtained using an object segmentation model as the trained machine learning model 406 in the architecture 400 of FIG. 4, where the object segmentation model can be trained using the architecture 200 of FIG. 2.

As shown in FIG. 9, an image 900 of a scene has been captured. As can be seen in FIG. 9, the scene includes a number of objects, such as a circular table, a window, a plant, a wall, and a floor. As shown in FIG. 10, a segmentation mask 1000 represents a segmentation mask that may be generated using a known approach. As can be seen in FIG. 10, the segmentation mask 1000 is not particularly accurate in identifying different objects in the image 900. For example, the boundaries of the window and plant are not particularly accurate, the table is incomplete and has large gaps, and the wall is incorrectly classified as two different objects. Part of the difficulty here can come from the fact that shadows produced by the sun on various objects in the image 900 are potentially leading to artifacts in the segmentation mask 1000.

As shown in FIG. 11, a segmentation mask 1100 represents a segmentation mask that may be generated using the techniques described above. As can be seen in FIG. 11, the segmentation mask 1100 is much more accurate in identifying the different objects in the image 900. For example, the boundaries of the window and plant are more clearly defined, the table is complete, and the wall is correctly classified as a single object. Among other things, the image-guided boundary refinement with classification function 504 of the boundary refinement function 416 can help to fill in the gaps of the table mask, which allows the table to be identified without large gaps.

The segmentation mask 1100 also identifies the object classes more accurately. For example, in FIG. 10, the plant in the scene is identified with a 49% certainty, which can be due to the identified boundary of the plant in the segmentation mask 1000. In FIG. 11, the plant in the scene is identified with much higher certainty, which can be due to the more accurate boundary of the plant in the segmentation mask 1100.

Figure 12A:
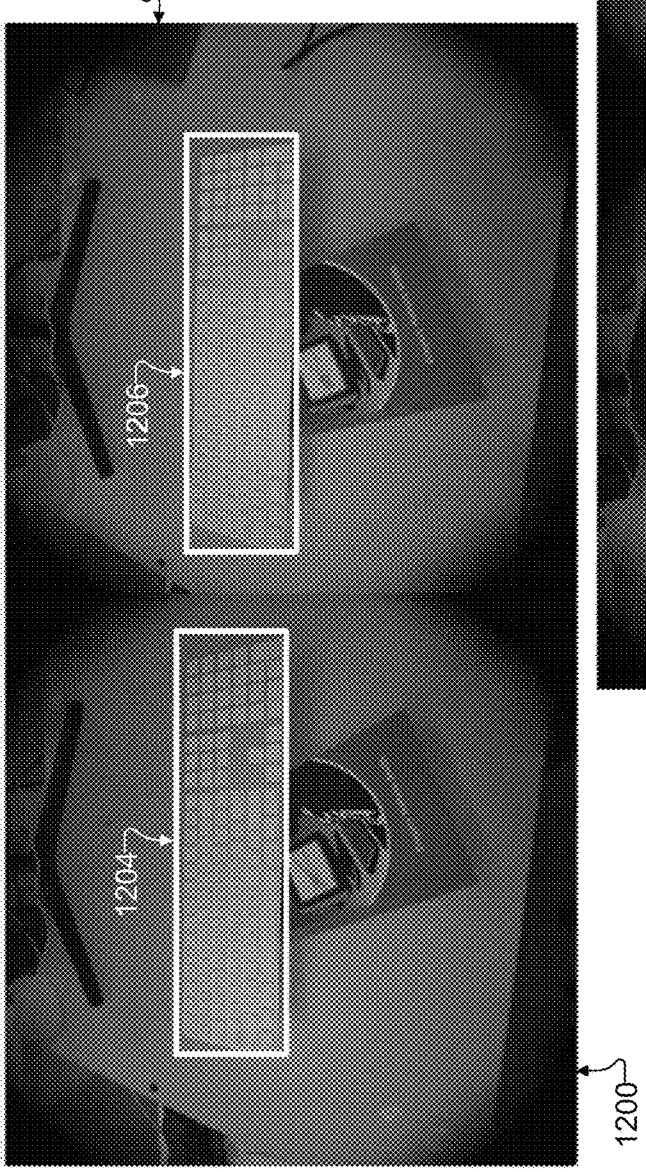
FIGS. 12A through 13B illustrate other example results obtainable using an object segmentation model that supports mask generation with object and scene segmentation for passthrough XR in accordance with this disclosure.

FIGS. 12A through 13B illustrate other example results obtainable using an object segmentation model that supports mask generation with object and scene segmentation for passthrough XR in accordance with this disclosure. In the example of FIGS. 12A and 12B, image frames 1200 and 1202 have been captured, where each image frame 1200 and 1202 captures a keyboard. The approaches described above may be used to identify regions 1204 and 1206 within the image frames 1200 and 1202, where each region 1204 and 1206 includes the keyboard. The regions 1204 and 1206 can be refined to generate boundaries 1208 and 1210 of the keyboard as shown in FIG. 12B. Each of these boundaries 1208 and 1210 may be used to define a mask that isolates the keyboard in each image frame 1200 and 1202. For instance, one mask can identify the pixels of the image frame 1200 within the boundary 1208 and mask out all other pixels, and another mask can identify the pixels of the image frame 1202 within the boundary 1210 and mask out all other pixels.

Figure 12B:
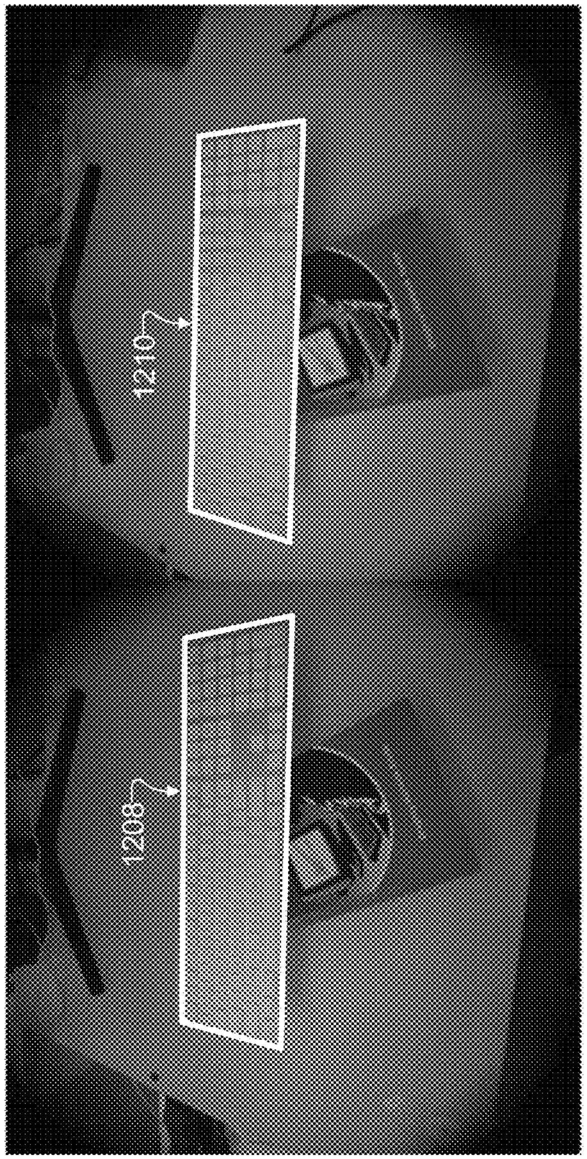

In FIGS. 12A and 12B, the keyboard can be identified even though it is physically overlapping another object (namely a book in this example). Without additional knowledge of the book, it may not be possible to identify the exact boundary of the book in each image frame 1200 and 1202. For example, unless the height of the book is known (such as from prior experience), there may be no way to define the boundary of the occluded portion of the book. Thus, in this example, only the boundaries of the keyboard are identified, although a boundary of the exposed portion of the book may be identified if needed or desired.

Figure 13A:
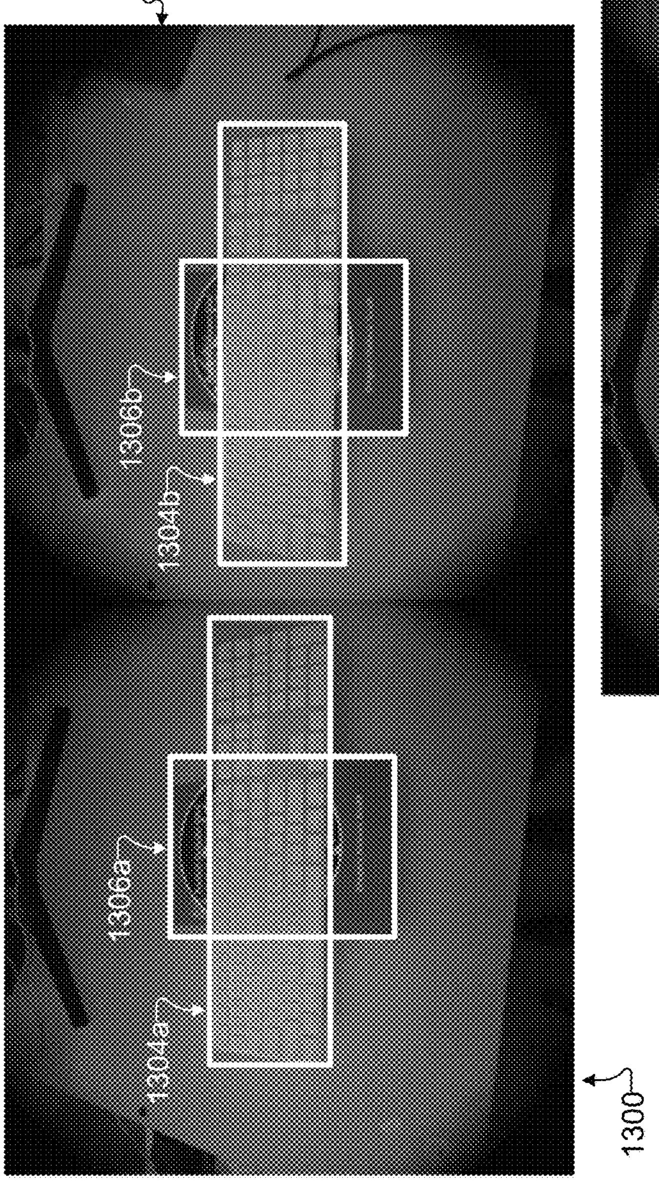
Figure 13B:
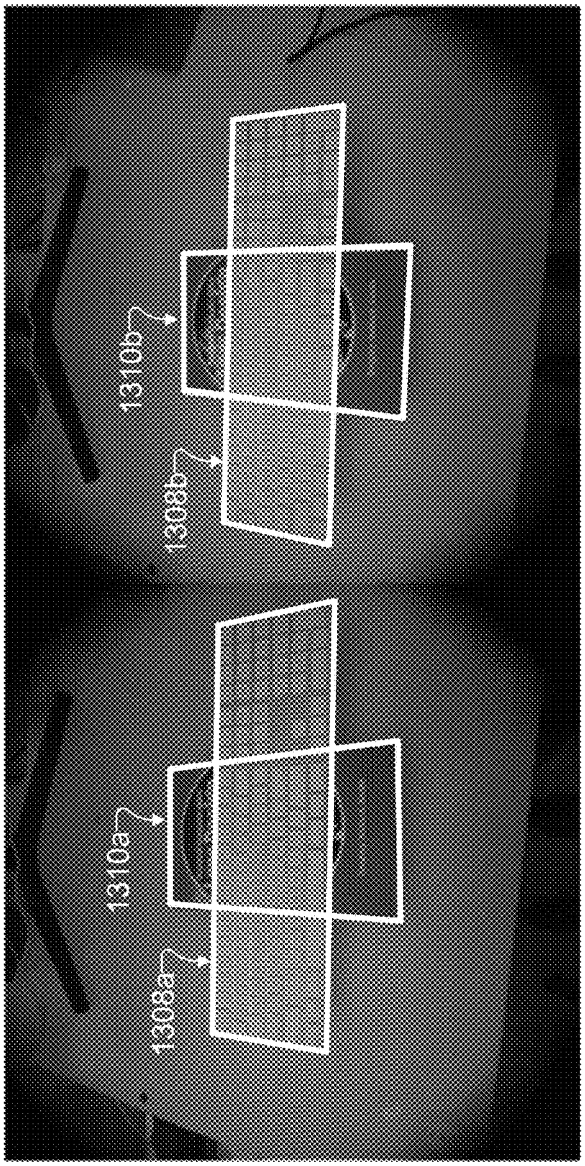

In the example of FIGS. 13A and 13B, image frames 1300 and 1302 have been captured, where each image frame 1300 and 1302 captures a keyboard. Again, the approaches described above may be used to identify regions 1304*a*-1304*b* and 1306*a*-1306*b* within the image frames 1300 and 1302, where each region 1304*a*-1304*b* includes the keyboard and each region 1306*a*-1306*b* includes the book. The regions 1304*a*-1304*b* and 1306*a*-1306*b* can be refined to generate boundaries 1308*a*-1308*b* and 1310*a*-1310*b* as shown in FIG. 13B. Each of these boundaries 1308*a*-1308*b* and 1310*a*-1310*b* may be used to define a mask that isolates the keyboard or book in each image frame 1300 and 1302.

In FIGS. 13A and 13B, the keyboard can again be identified even though it is physically overlapping another object. Here, however, it is possible to identify the likely boundary of the book in each image frame 1300 and 1302. This can be based on knowledge of the underlying object, such as knowledge that most books are rectangular. Based on that knowledge, it is possible to estimate the likely boundary of the book even though it is partially occluded by the keyboard. Note that this represents one example in which adequate information about an overlapped object is available. It is possible for a system to learn and estimate shapes of various objects, such as based on prior experiences or training.

Although FIGS. 9 through 13B illustrate examples of results obtainable using an object segmentation model that supports mask generation with object and scene segmentation for passthrough XR, various changes may be made to FIGS. 9 through 13B. For example, the specific examples of image frames, objects, and associated segmentation results are for illustration and explanation only and can easily vary based on the circumstances, such as the specific scene being imaged.

Figure 14:
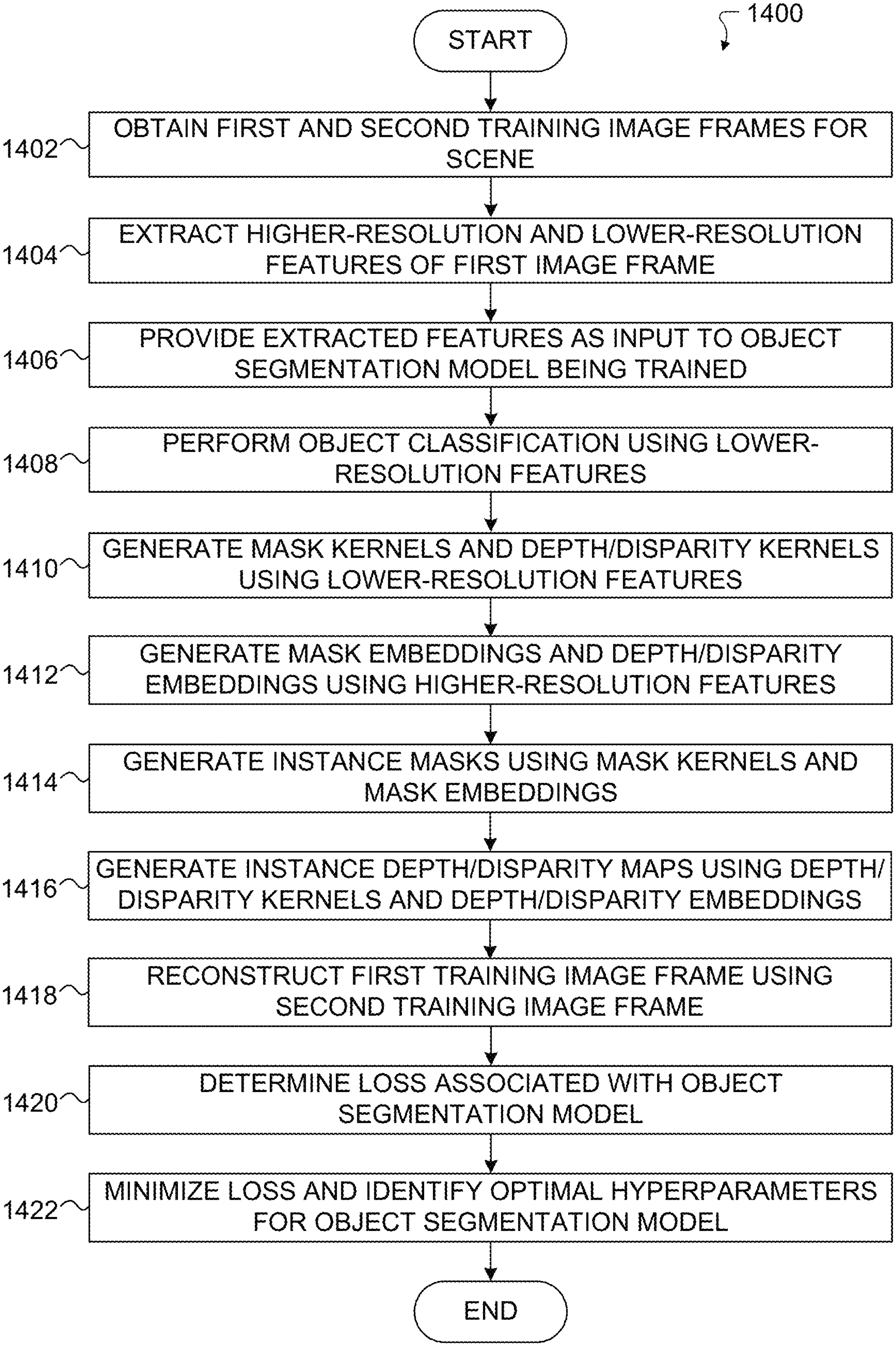
FIG. 14 illustrates an example method for training an object segmentation model to support mask generation with object and scene segmentation for passthrough XR in accordance with this disclosure.

FIG. 14 illustrates an example method 1400 for training an object segmentation model to support mask generation with object and scene segmentation for passthrough XR in accordance with this disclosure. For ease of explanation, the method 1400 is described as being performed by the server 106 in the network configuration 100 of FIG. 1, where the server 106 can implement the architecture 200 of FIG. 2.

However, the method 1400 may be performed using any other suitable device(s) (such as the electronic device 101) with any other suitable architecture(s) and in any other suitable system(s).

As shown in FIG. 14, first and second training image frames for a scene are obtained at step 1402. This may include, for example, the processor 120 of the server 106 obtaining a left see-through image frame 204 and a right see-through image frame 206, such as from the training data store 202. Note that while training of a machine learning model typically includes numerous image pairs, the use of one left see-through image frame 204 and one right see-through image frame 206 is described here for simplicity.

Higher-resolution features and lower-resolution features are extracted from the first image frame at step 1404. This may include, for example, the processor 120 of the server 106 performing the feature extraction function 208 in order to extract the lower-resolution features 210 and higher-resolution features 212 from the image frame 204. The extracted features are provided to an object segmentation model being trained at step 1406. This may include, for example, the processor 120 of the server 106 providing the lower-resolution features 210 and higher-resolution features 212 as inputs to the object segmentation model being trained.

Object classification is performed by the object segmentation model using the lower-resolution features at step 1408. This may include, for example, the processor 120 of the server 106 performing the classification function 214 in order to identify objects in the image frames 204 and 206 and classify the detected objects, such as by classifying the detected objects into different object classes or types. Mask kernels and depth or disparity kernels are generated by the object segmentation model using the lower-resolution features at step 1410. This may include, for example, the processor 120 of the server 106 performing the mask kernel generation function 216 to generate kernel masks based on the lower-resolution features 210. This may also include the processor 120 of the server 106 performing the depth or disparity kernel generation function 218 to generate depth or disparity kernels based on the lower-resolution features 210.

Mask embeddings and depth or disparity embeddings are generated by the object segmentation model using the higher-resolution features at step 1412. This may include, for example, the processor 120 of the server 106 performing the mask embedding generation function 220 to generate mask embeddings based on the higher-resolution features 212. This may also include the processor 120 of the server 106 performing the depth or disparity embedding generation function 222 to generate depth or disparity embeddings based on the higher-resolution features 212. Instance masks are generated by the object segmentation model using the mask kernels and mask embeddings at step 1414. This may include, for example, the processor 120 of the server 106 performing the instance mask generation function 224 to generate instance masks for objects in the image frames 204 and 206 based on the mask kernels and mask embeddings. Instance depth or disparity maps are generated by the object segmentation model using the depth or disparity kernels and depth or disparity embeddings at step 1416. This may include, for example, the processor 120 of the server 106 performing the instance depth or disparity map generation function 226 to generate instance depth or disparity maps for objects in the image frames 204 and 206 based on the depth or disparity kernels and depth or disparity embeddings.

The first training image frame is reconstructed using the second training image frame at step 1418. This may include, for example, the processor 120 of the server 106 performing the reconstruction loss calculation function 232 to generate a reconstructed image frame 304. As a particular example, the reconstructed image frame 304 can be generated by projecting or otherwise transforming the image frame 206 based on the one or more instance depth or disparity maps associated with the image frame 204. A loss associated with the object segmentation model is determined at step 1420. This may include, for example, the processor 120 of the server 106 performing the reconstruction loss calculation function 232 to calculate a reconstruction loss based on errors between the image frame 204 and the reconstructed image frame 304. This may also include the processor 120 of the server 106 performing the segmentation loss calculation function 228 to determine a segmentation loss. The server 106 may combine the reconstruction loss and the segmentation loss (or one or more other or additional losses) to identify a total loss associated with the object segmentation model. Again, note that the total loss here may be based on errors associated with multiple pairs of image frames 204 and 206. A loss associated with the object segmentation model is minimized and optimal hyperparameters of the object segmentation model are identified at step 1422. This may include, for example, the processor 120 of the server 106 using a minimization algorithm that attempts to minimize the total loss by adjusting the weights or other hyperparameters of the object segmentation model. Once training is completed, the object segmentation model may be used in any suitable manner, such as when the object segmentation model is placed into use by the server 106 or deployed to one or more other devices (such as the electronic device 101) for use.

Although FIG. 14 illustrates one example of a method 1400 for training an object segmentation model to support mask generation with object and scene segmentation for passthrough XR, various changes may be made to FIG. 14. For example, while shown as a series of steps, various steps in FIG. 14 may overlap, occur in parallel, occur in a different order, or occur any number of times (including zero times). Also, while it is assumed above that the first training image frame is a left see-through image frame 204 and the second training image frame is a right see-through image frame 206, the left and right image frames may be reversed.

Figure 15:
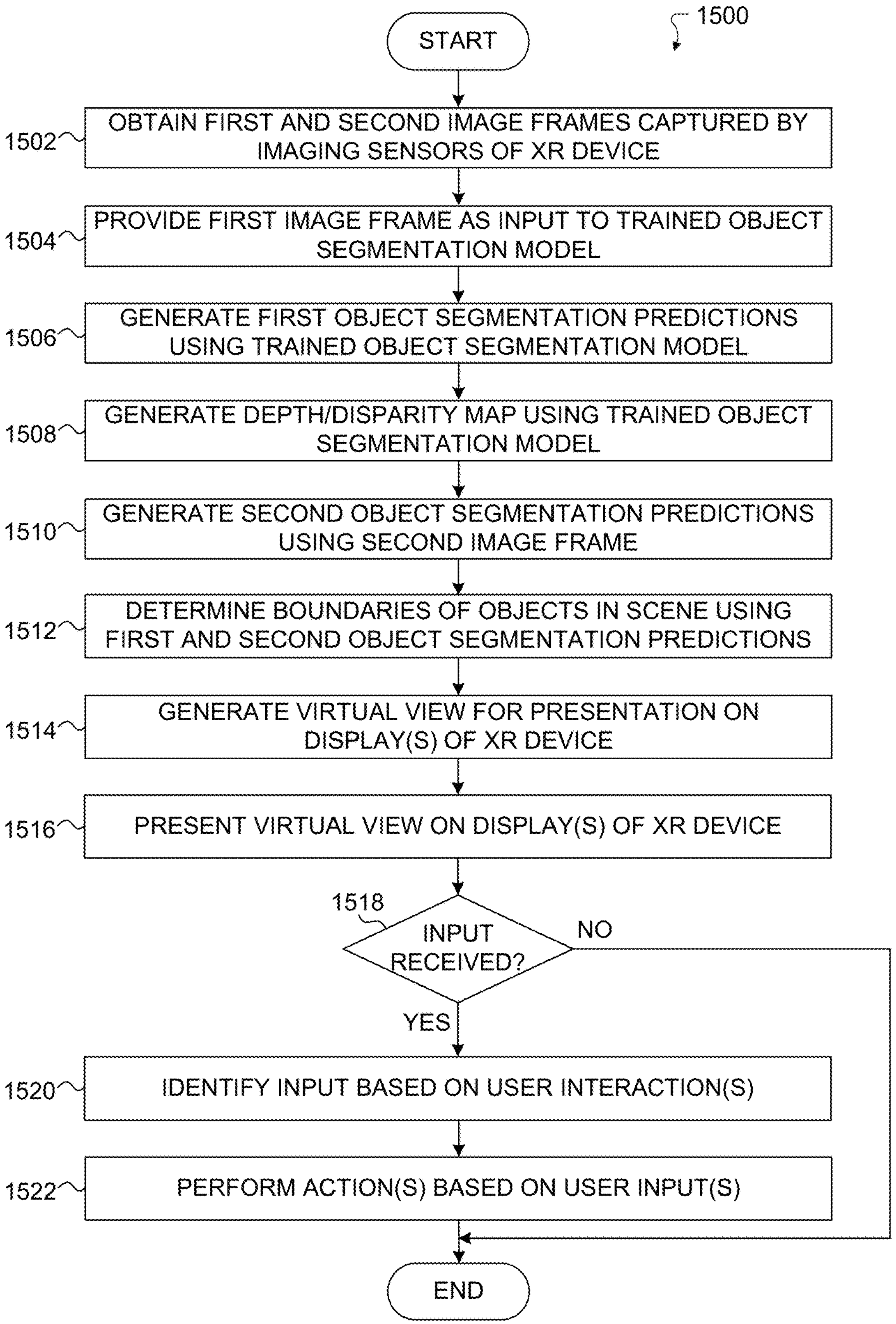
FIG. 15 illustrates an example method for using an object segmentation model that supports mask generation with object and scene segmentation for passthrough XR in accordance with this disclosure.

FIG. 15 illustrates an example method 1500 for using an object segmentation model that supports mask generation with object and scene segmentation for passthrough XR in accordance with this disclosure. For ease of explanation, the method 1500 is described as being performed by the electronic device 101 in the network configuration 100 of FIG. 1, where the electronic device 101 can implement the architecture 400 of FIG. 4. However, the method 1500 may be performed using any other suitable device(s) (such as the server 106) with any other suitable architecture(s) and in any other suitable system(s).

As shown in FIG. 15, first and second image frames for a scene that are captured by an XR device are obtained at step 1502. This may include, for example, the processor 120 of the electronic device 101 obtaining a left see-through image frame 402 and a right see-through image frame 404 using multiple imaging sensors 180 of the electronic device 101. The first image frame is provided as input to a trained object segmentation model at step 1504. This may include, for example, the processor 120 of the electronic device 101 providing the left see-through image frame 402 to the trained machine learning model 406. The trained machine learning model 406 may be trained in accordance with the method 1400 of FIG. 14.

First object segmentation predictions are generated using the trained machine learning model at step 1506, and a depth or disparity map is generated using the trained machine learning model at step 1508. This may include, for example, the processor 120 of the electronic device 101 using the trained machine learning model 406 to simultaneously generate a segmentation 408 of the left image frame 402 and a depth or disparity map 410 of the left image frame 402. Second object segmentation predictions are generated using the second image frame at step 1510. In some cases, this may include the processor 120 of the electronic device 101 using the trained machine learning model 406 to generate a segmentation 414 of the right image frame 404. In other cases, this may include the processor 120 of the electronic device 101 performing the image-guided segmentation reconstruction function 412 to project or otherwise transform the segmentation 408 of the left image frame 402 based on the depth or disparity map 410 of the left image frame 402 in order to produce the segmentation 414 of the right image frame 404.

Boundaries of objects in the scene are determined using the first and second object segmentation predictions at step 1512. This may include, for example, the processor 120 of the electronic device 101 performing the boundary refinement function 416 in order to generate a finalized segmentation 418 for the image frames 402 and 404. As a particular example, this may include the processor 120 of the electronic device 101 performing the object boundary extraction and boundary area expansion function 502, image-guided boundary refinement with classification function 504, and post-processing function(s) 506 in order to generate a refined panoptic segmentation 508. Part of this process may include identifying objects that overlap or that are close to one another and classifying pixels in expanded boundary regions associated with the objects, which can be done to complete one or more incomplete regions associated with at least one of the objects in the scene.

A virtual view may be generated for presentation on at least one display of the XR device at step 1514. This may include, for example, the processor 120 of the electronic device 101 performing the 3D object and scene reconstruction function 510, left and right view generation function 512, and distortion and aberration correction function 514. This can lead to the generation of left and right virtual views that are suitable for presentation. The virtual view is presented on the display(s) of the XR device at step 1516. This may include, for example, the processor 120 of the electronic device 101 performing the left and right view rendering function 516 and the left and right view display function 518 in order to render and display the left and right virtual views.

Optionally, a determination can be made whether input is received from the user of the XR device via at least one of the objects in the scene at step 1518. This may include, for example, the processor 120 of the electronic device 101 determining whether any segmented object represents a physical keyboard and whether the user appears to be typing on the physical keyboard. If so, input based on the user's interaction(s) with the keyboard can be identified at step 1520 and used to perform one or more actions at step 1522. This may include, for example, the processor 120 of the electronic device 101 using a mask and a depth or disparity map associated with the keyboard to estimate which buttons of the keyboard are selected by the user. This may also include the processor 120 of the electronic device 101 using the identified buttons of the keyboard to identify user input and perform one or more actions requested by the user based on the user input. This can be done without any physical or wireless connection for sending data from the keyboard to the XR device. Note, however, that the identification of a keyboard or other user input device may be used in any other suitable manner, such as to ensure that no digital content is superimposed over the keyboard or other user input device when generating the virtual view.

Although FIG. 15 illustrates one example of a method 1500 for using an object segmentation model that supports mask generation with object and scene segmentation for passthrough XR, various changes may be made to FIG. 15. For example, while shown as a series of steps, various steps in FIG. 15 may overlap, occur in parallel, occur in a different order, or occur any number of times (including zero times). Also, while it is assumed above that the first image frame is a left see-through image frame 402 and the second image frame is a right see-through image frame 404, the left and right image frames may be reversed.

Although this disclosure has been described with example embodiments, various changes and modifications may be suggested to one skilled in the art. It is intended that this disclosure encompass such changes and modifications as fall within the scope of the appended claims.

What is claimed is:

1. A method comprising:

obtaining first and second image frames of a scene;

providing the first image frame as input to an object segmentation model, the object segmentation model trained to generate first object segmentation predictions for objects in the scene and a depth or disparity map based on the first image frame;

generating second object segmentation predictions for the objects in the scene based on the second image frame;

determining boundaries of the objects in the scene based on the first and second object segmentation predictions; and generating a virtual view for presentation on a display of an extended reality (XR) device based on the boundaries of the objects in the scene;

wherein the object segmentation model is trained on extracted features of a training image frame, the extracted features comprising lower-resolution features of the training image frame and higher-resolution features of the training image frame.

2. The method of claim 1, wherein generating the second object segmentation predictions comprises:

performing image-guided segmentation reconstruction to generate the second object segmentation predictions based on the second image frame, the first object segmentation predictions, and the depth or disparity map, the second object segmentation predictions spatially consistent with the first object segmentation predictions.

3. The method of claim 1, wherein generating the second object segmentation predictions comprises:

providing the second image frame as input to the object segmentation model, the object segmentation model configured to generate the second object segmentation predictions for the objects in the scene based on the second image frame.

4. The method of claim 1, wherein determining the boundaries of the objects in the scene comprises:

performing boundary refinement based on the first and second object segmentation predictions.

5. The method of claim 4, wherein performing the boundary refinement comprises, for each of at least one of the boundaries:

identifying a boundary region associated with the boundary;

expanding the identified boundary region; and performing classification of pixels within the expanded boundary region to complete one or more incomplete regions associated with at least one of the objects in the scene.

6. The method of claim 1, wherein generating the virtual view comprises:

using one or more masks based on the boundaries of one or more of the objects in the scene to perform object and scene reconstruction in order to generate a three-dimensional (3D) model of the scene; and using the 3D model to generate the virtual view.

7. The method of claim 1, wherein:

one of the objects in the scene comprises a keyboard; and the method further comprises identifying user input to the XR device based on physical or virtual interactions of a user with the keyboard.

8. An extended reality (XR) device comprising:

multiple imaging sensors configured to capture first and second image frames of a scene;

at least one processing device configured to:

provide the first image frame as input to an object segmentation model, the object segmentation model trained to generate first object segmentation predictions for objects in the scene and a depth or disparity map based on the first image frame;

generate second object segmentation predictions for the objects in the scene based on the second image frame;

determine boundaries of the objects in the scene based on the first and second object segmentation predictions; and generate a virtual view based on the boundaries of the objects in the scene; and at least one display configured to present the virtual view;

wherein the object segmentation model is trained on extracted features of a training image frame, the extracted features comprising lower-resolution features of the training image frame and higher-resolution features of the training image frame.

9. The XR device of claim 8, wherein, to generate the second object segmentation predictions, the at least one processing device is configured to perform image-guided segmentation reconstruction to generate the second object segmentation predictions based on the second image frame, the first object segmentation predictions, and the depth or disparity map, the second object segmentation predictions spatially consistent with the first object segmentation predictions.

10. The XR device of claim 8, wherein, to generate the second object segmentation predictions, the at least one processing device is configured to provide the second image frame as input to the object segmentation model, the object segmentation model configured to generate the second object segmentation predictions for the objects in the scene based on the second image frame.

11. The XR device of claim 8, wherein, to determine the boundaries of the objects in the scene, the at least one processing device is configured to perform boundary refinement based on the first and second object segmentation predictions.

12. The XR device of claim 11, wherein, to perform the boundary refinement, the at least one processing device is configured to:

identify a boundary region associated with the boundary;

expand the identified boundary region; and perform classification of pixels within the expanded boundary region to complete one or more incomplete regions associated with at least one of the objects in the scene.

13. The XR device of claim 8, wherein, to generate the virtual view, the at least one processing device is configured to:

use one or more masks based on the boundaries of one or more of the objects in the scene to perform object and scene reconstruction in order to generate a three-dimensional (3D) model of the scene; and use the 3D model to generate the virtual view.

14. The XR device of claim 8, wherein:

one of the objects in the scene comprises a keyboard; and the at least one processing device is further configured to avoid placing one or more virtual objects over the keyboard in the virtual view.

15. A method comprising:

obtaining first and second training image frames of a scene;

extracting features of the first training image frame, the extracted features comprising lower-resolution features of the first training image frame and higher-resolution features of the first training image frame;

providing the extracted features of the first training image frame as input to an object segmentation model being trained, the object segmentation model configured to generate object segmentation predictions for objects in the scene and a depth or disparity map;

reconstructing the first training image frame based on the depth or disparity map and the second training image frame; and updating the object segmentation model based on the first training image frame and the reconstructed first training image frame.

16. The method of claim 15, further comprising:

generating mask embeddings and depth or disparity embeddings based on the higher-resolution features of the first training image frame;

generating instance masks associated with the objects in the scene based on the lower-resolution features of the first training image frame and the mask embeddings; and generating instance depth or disparity maps associated with the objects in the scene based on the lower-resolution features of the first training image frame and the depth or disparity embeddings.

17. The method of claim 16, wherein:

differences between the first training image frame and the reconstructed first training image frame are used to generate a reconstruction loss;

differences between the instance masks and ground truth segmentations are used to generate a segmentation loss; and the reconstruction loss and the segmentation loss are used to update the object segmentation model.

18. The method of claim 16, wherein generating the instance masks and generating the instance depth or disparity maps comprise:

performing classification to identify the objects in the scene based on the lower-resolution features of the first training image frame;

generating mask kernels for the objects in the scene based on the lower-resolution features of the first training image frame;

creating depth or disparity kernels for depth information within the scene based on the lower-resolution features of the first training image frame;

generating the instance masks based on the mask embeddings and the mask kernels; and generating the instance depth or disparity maps based on the depth or disparity embeddings and the depth or disparity kernels.

19. The method of claim 15, wherein the object segmentation model is trained to identify boundaries of overlapping objects by:

identifying a first boundary of a first object; and estimating a second boundary of a second object, the second boundary including a boundary for a portion of the second object occluded by the first object.

20. The method of claim 15, wherein the object segmentation model is trained without using ground truth depth or disparity information associated with the first and second training image frames.

* * * * *